(12) United States Patent
Takahara

(10) Patent No.: US 6,766,107 B2
(45) Date of Patent: Jul. 20, 2004

(54) LENS-FITTED PHOTO FILM UNIT WITH STOP CHANGING DEVICE

(75) Inventor: Shigeki Takahara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 299 days.

(21) Appl. No.: 09/951,728

(22) Filed: Sep. 14, 2001

(65) Prior Publication Data

US 2002/0064381 A1 May 30, 2002

(30) Foreign Application Priority Data

Sep. 14, 2000 (JP) ........................................ 2000-280538
Sep. 14, 2000 (JP) ........................................ 2000-280539
Sep. 18, 2000 (JP) ........................................ 2000-281679

(51) Int. Cl.[7] ........................ G03B 17/02; G03B 15/03
(52) U.S. Cl. ........................ 396/6; 396/159; 396/179
(58) Field of Search ........................ 396/6, 176, 159, 396/179, 205, 206, 170, 161

(56) References Cited

U.S. PATENT DOCUMENTS 5,634,163 A    5/1997  Kamata
6,233,403 B1 *  5/2001  Aratame et al. ............. 396/6
6,480,682 B1 * 11/2002  Kamata ....................... 396/542

FOREIGN PATENT DOCUMENTS

| JP | 08-114836 | 5/1996 |
| JP | 10-333287 | 12/1998 |
| JP | 2000-147617 | 5/2000 |

* cited by examiner

Primary Examiner—David M. Gray
(74) Attorney, Agent, or Firm—Young & Thompson

(57) ABSTRACT

A lens-fitted photo film unit is provided with a stop blade that is switched over between a small aperture position and a large aperture position depending upon a subject brightness measured through a photometric circuit that is activated when a shutter button is pressed. The film unit has an f-number of not more than f/8.0 when the stop blade is in the large aperture position, or an f-number of not less than f/14 when the stop blade is in the small aperture position. The film unit is also provided with a flash light control circuit in connection to a flash device. The flash light control circuit measures a light amount reflected from a subject while a flash light is projected from the flash device toward the subject, to stop the flash device from projecting the flash light when the measured light amount reaches a predetermined value.

15 Claims, 24 Drawing Sheets

LENS-FITTED PHOTO FILM UNIT WITH STOP CHANGING DEVICE

BACKGROUND OF THE INVENTION

1. Field of the Invention

The present invention relates to a lens-fitted photo film unit with a stop changing device for changing the aperture size of an aperture-stop, and more particularly to a lens-fitted photo film unit that can provide good quality pictures in any photographic conditions.

2. Background Arts

A variety of lens-fitted photo film units have been produced and sold in the market. The lens-fitted photo film unit, hereinafter called the film unit, is preloaded with a roll of unexposed photo filmstrip, and is provided with simple photographic mechanisms. For the purpose of making the film unit as handy and economy as possible, the film unit conventionally uses a simple taking lens whose focal length, focal point and aperture size are fixed. In order to obtain moderate focusing conditions in a wide subject distance range from about 1 m to the infinity, the taking lens is designed to have a large depth of the field, and the f-stop number or f-number is set at around "f/10". With such a fixed f-number, photographs with adequate exposure conditions can be obtained only in limited photographic conditions. To solve this problem, most of the film units is provided with a flash device. In correspondence with the f-number of around "f/10", the guide number of the flash device is set at around "10". That is, the intensity of the flash light is relatively high.

With such a flash light, however, the difference in brightness between a main subject and a background becomes very large in those scenes where the flash light merely reaches the main subject and does not reach the background, and the brightness of the background is relatively low. In that case, if the photographed picture is printed in a condition adjusted to the exposure condition of the main subject, the background would become too dark.

To obtain satisfactory exposure conditions in the flash photography with respect to the background and the main subject as well, Japanese Laid-open Patent Application Nos. 8-114836 and 10-333287 disclose a film unit wherein the aperture size of the aperture-stop is enlarged when the flash photography is selected, for example, by switching over a stop blade in cooperation with a flash charge switch. Thereby, it becomes possible to avoid overexposure in those scenes where the subject brightness is so high that the flash light is not needed. On the other hand, where the subject brightness is low, a sufficient exposure amount is obtained by using the flash light and the large size aperture in combination.

However, because the decision as to whether the flash light is necessary or not depends on the photographer's subjectivity, the risk of resulting improperly exposed photographs is relatively high. Moreover, where the main subject exits in a near range of about 1 m to 2 m, the main subject would be photographed in an overexposed condition when the large size aperture is used in the flash photography.

There have been suggested many film units that measure the subject brightness and change the aperture size of the aperture-stop depending upon the subject brightness. However, even in such a film unit, if the combination between the f-number, the shutter speed, the film speed and the guide number of the flash device is inappropriate, proper exposure conditions cannot be obtained.

SUMMARY OF THE INVENTION

In view of the foregoing, an object of the present invention is to provide a film unit that prevents overexposure of the main subject in the flash photography if the main subject exists in the near range, and also achieves adequate exposure conditions with respect to the background as well as the main subject in any scenes.

Another object of the present invention is to provide a film unit, of which performance factors, including f-number, shutter speed, film speed and guide number of a flash device, are optimized as a whole.

According to an aspect of the present invention, a lens-fitted photo film unit comprises a flash device for projecting a flash light toward a subject; a flash light control device that measures a light amount reflected from the subject while the flash device is projecting the flash light, and stops the flash device from projecting the flash light when the measured light amount reaches a predetermined value; and a stop changing device that changes over the aperture size of an aperture-stop at least between a large size and a small size.

Since the flash light control device stops the flash device from flashing when the light reflected from the subject reaches the predetermined amount, overexposure of the subject is prevented in the flash photography even if the subject exists in the near range.

According to a preferred embodiment, the stop changing device cooperates with a flash ON-OFF member that is manually operated to turn the flash device on or off, such that the stop changing device sets the aperture-stop at the large size while the flash device is on, or at the small size while the flash device is off.

Because the aperture-stop is set at the large size in the flash photography, the background is prevented from being too dark in comparison with the lightness of the main subject.

According to another aspect of the present invention, a lens-fitted photo film unit comprises a flash device for projecting a flash light toward a subject; a flash light control device that measures a light amount reflected from the subject while the flash device is projecting the flash light, and stops the flash device from projecting the flash light when the measured light amount reaches a predetermined value; and a stop changing device that measures a subject brightness and changes over the aperture size of an aperture-stop at least between a large size and a small size depending upon the measured subject brightness.

Since the aperture-stop is changed over depending upon the subject brightness, the photographer does not need to decide whether the aperture-stop is to be set at the small size or the large size. Even when the flash light is used for a relatively bright subject, overexposure is prevented because the flash device is stopped from flashing when the light amount reflected from the subject reaches the predetermined value.

In order to obtain adequately exposed photographs under any photographic conditions, the present invention suggests determining an f-number of the taking with the large aperture-stop size to satisfy the following condition (1), and an f-number of the taking lens with the small aperture-stop size to satisfy the following condition (2):

| | |
|---|---|
| $6 \leq AV+TV-SV+5 \leq 11.5$ | Condition (1) |
| $10.5 \leq AV+TV-SV+5 \leq 15$ | Condition (2) | wherein $AV=\log^2(\text{f-number}^2)$, $TV=\log^2(1/\text{shutter speed})$, and $SV=\log^2(0.32 \cdot \text{film speed})$.

According to a preferred embodiment, the f-number of the taking with the large aperture-stop size is determined to be not more than f/8.0, and the f-number of the taking lens with the small aperture-stop size is determined to be not less than f/14. It is preferable to provide the film unit with a flash device whose guide number is equal to or more than 4 but less than 8.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
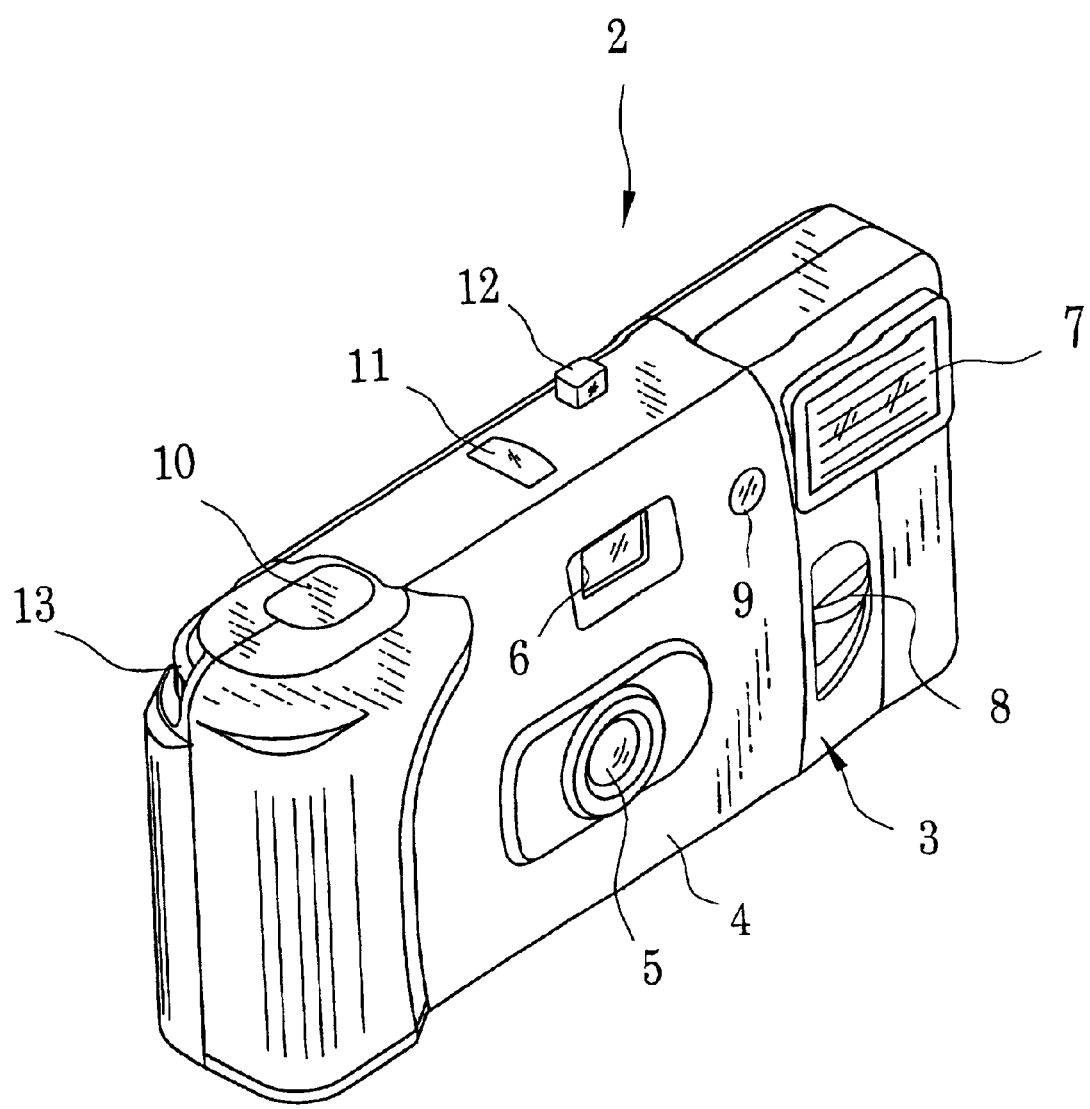
FIG. 1 is a perspective view of a film unit according to a first embodiment of the present invention.

As shown in FIG. 1, a film unit 2 has a unit body 3 that is preloaded with an unexposed photo film cartridge and is provided with photographic mechanisms. A label 4 is put around the unit body 3 such that necessary parts for photography of the unit body 3, including a taking lens 5, a finder objective window 6, a flash projector 7, a flash ON-OFF knob 8, a shutter button 10, a frame counter window 11, a charge condition indicator 12 and a film winding wheel 13 are exposed. Also a light receiving window 9 is exposed through the label 4. As described in detail later, the light receiving window 9 is provided for receiving light that is projected from the flash projector 7 and then reflected from a subject. The light receiving window 9 is provided with a transparent or semi-transparent plastic protection plate for preventing entrance of dusts inside the unit body 3.

Figure 2:
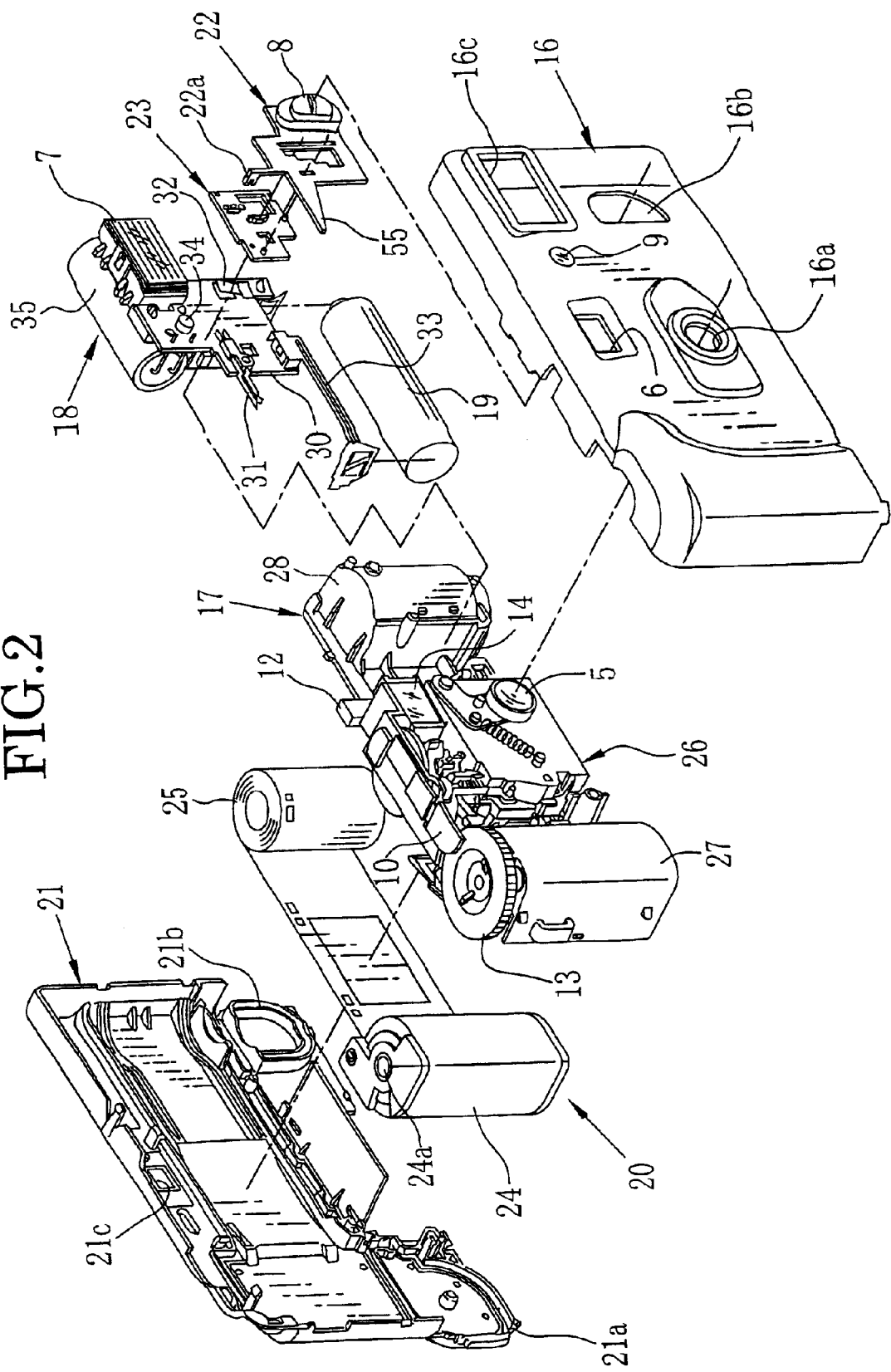
FIG. 2 is an exploded perspective view of a unit body of the film unit of the first embodiment.

FIG. 2 shows an interior of the unit body 3. The unit body 3 is mainly constituted of a front cover 16, a main body portion 17, a flash unit 18, a battery 19, a rear cover 21, a switching plate 22, a supporting plate 23 and a mechanism unit 26. The mechanism unit 26 includes the taking lens 5, the shutter button 10, and other necessary mechanisms for photography. Also a finder optical system 14 is integrated into the mechanism unit 26. The mechanism unit 26 is mounted in between a cartridge chamber 27 and a film roll chamber 28 of the main body portion 17.

A cartridge shell 24 and a roll of unexposed photo filmstrip 25 of a photo film cartridge 20 are respectively placed in the cartridge chamber 27 and the film roll chamber 28. A trailing end of the photo filmstrip 25 is secured to a spool 24a of the cartridge shell 24. In this embodiment, the photo film cartridge 20 is of IX240 type, whose cartridge shell 24 has a film advancing mechanism that permits advancing a leading end of the photo filmstrip 25 out of the cartridge shell 24 by rotating a spool 24a in an unwinding direction, even where the entire length of the filmstrip 25 is located inside the cartridge shell 24. A not-shown shaft of the film winding wheel 13 is engaged in the spool 24a, so the spool 24a is rotated together with the film winding wheel 13. In this embodiment, the photo filmstrip 25 has a film speed of ISO 800.

The rear cover 21 light-tightly closes the rear side of the main body portion 17 after the photo film cartridge 20 is loaded in the main body portion 17. Thereafter, bottom lids 21a and 21b, which are formed integrally with the rear cover 21, close bottom sides of the cartridge chamber 27 and the film chamber 28 light-tightly. The bottom lid 21a on the bottom of the cartridge chamber 27 is expected to be opened in a photo-lab, to remove the cartridge shell 24 from the unit body 3, for development and printing after the photo film-strip 25 is entirely exposed and rewound into the cartridge shell 24. Designated by 21c is a finder eyepiece window.

The flash unit 18 is an assembly in which elements of a flash circuit, including a synchronized flash trigger switch 31, a charge switch 32 and a main capacitor 35, are mounted on a printed circuit board 30. As a power source, a battery 19 is connected to the flash circuit through a metal contact strip 33. The charge switch 32 is turned on and off by sliding the flash ON-OFF knob 8 up and down. The flash ON-OFF knob 8 is integrally formed on the switching plate 22 and is exposed to the front through a cutout 16b of the front cover 16. On the back side of the switching plate 22 is formed a not-shown protrusion that pushes the charge switch 32 to its ON position while the flash ON-OFF knob 8 is in the upper position. The switching plate 22 is sandwiched between the supporting plate 23 and the front cover 16, such that the flash ON-OFF knob 8 may slide up and down while guided by the supporting plate 23.

Figure 3:
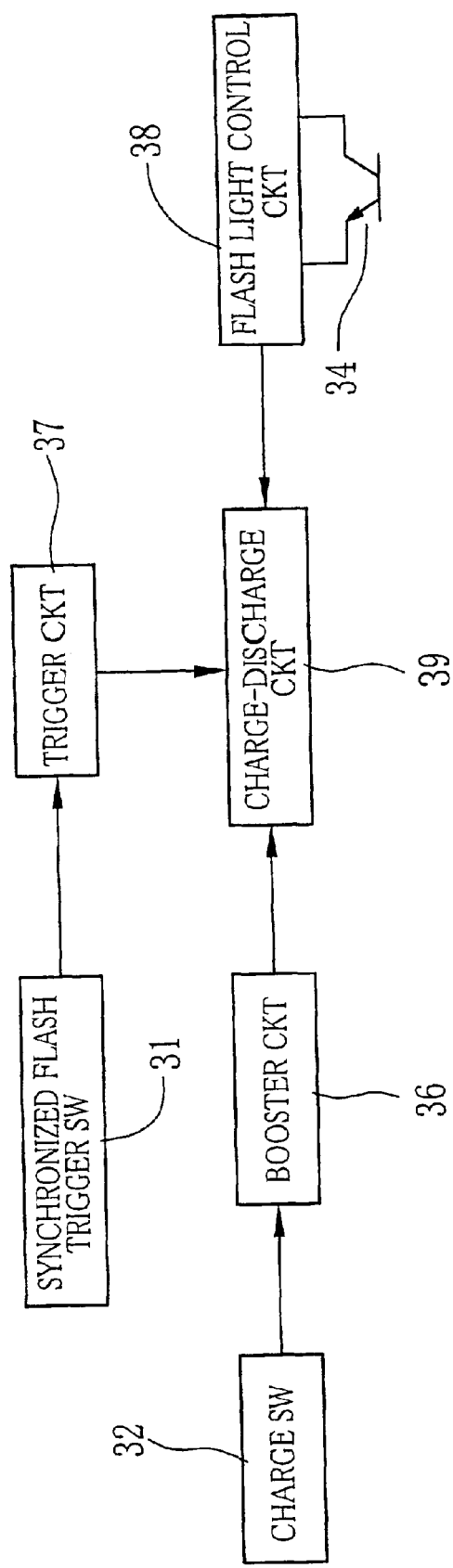
FIG. 3 is a functional block diagram illustrating relations between respective elements of a flash device and a flash light control circuit.
Figure 4:
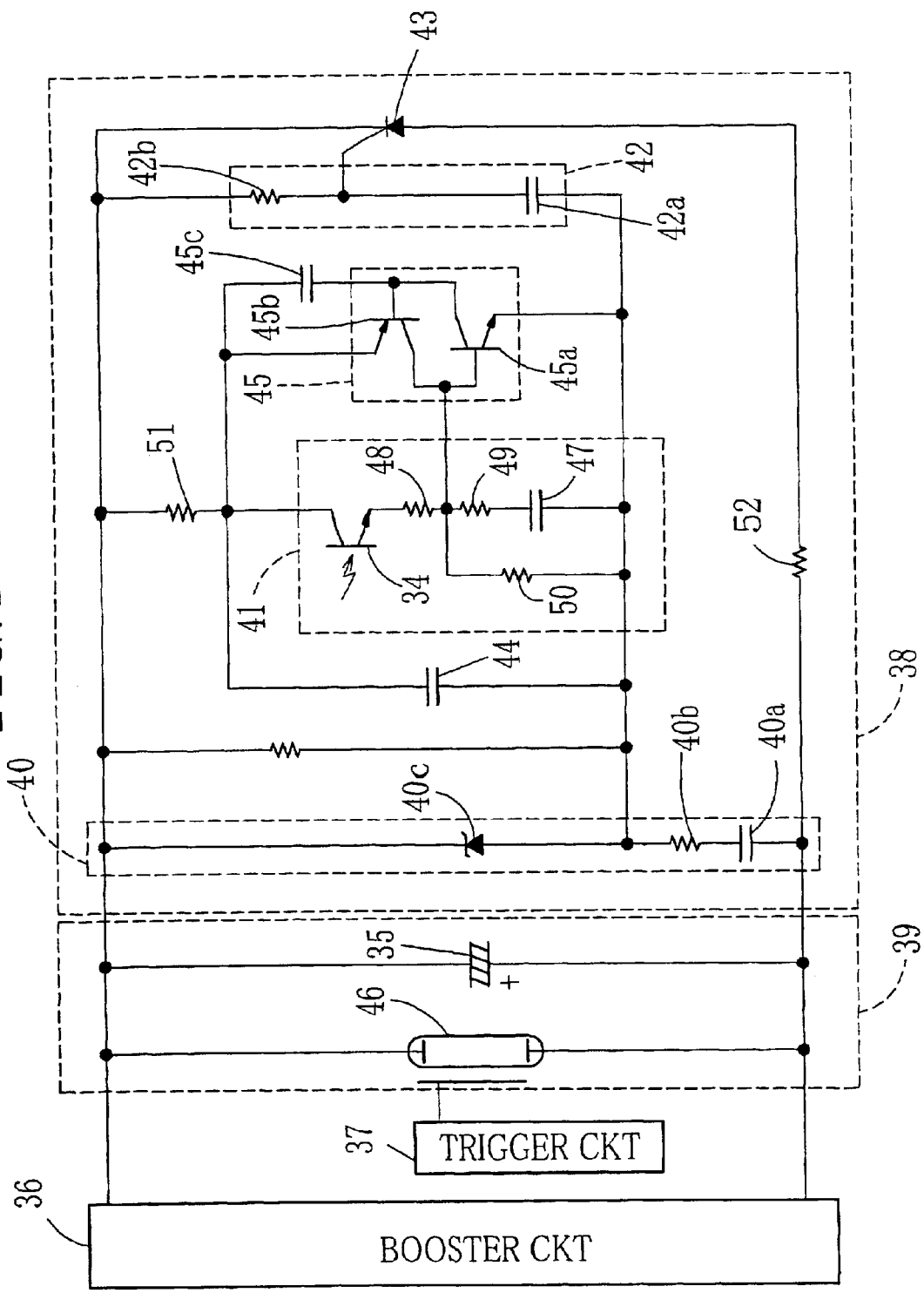
FIG. 4 is a circuit diagram of the flash light control circuit.

As shown in FIGS. 3 and 4, the charge switch 32 is turned on to activate a booster circuit 36. The booster circuit 36 is connected to a charge-discharge circuit 39 consisting of the main capacitor 35 and a flash discharge tube 46 that is located inside the flash projector 7. The booster circuit 36 boosts a power source voltage from the battery 19 up to a predetermined high voltage and charges the main capacitor 35 with the high voltage. The synchronized flash trigger switch 31 is connected to a trigger circuit 37. When the synchronized flash trigger switch 31 is turned on, the trigger circuit 37 applies a trigger voltage to a flash discharge tube 46 of the charge-discharge circuit 39, so the main capacitor 35 is discharged through the flash discharge tube 46, causing the flash discharge tube 46 to emit light. The flash light emitted from the flash discharge tube 46 is reflected by a not-show reflector of the flash projector 7 and thus projected toward the photographic subject through a diffusion plate of the flash projector 7 that is fitted in a flash window 16c of the front cover 16c. It is to be noted that the main capacitor 35 has a capacitance of 50 $\mu F$ in this embodiment, so the flash light reaches the subject distance range of 5 m or so.

Also a photo sensor 34 is mounted on the printed circuit board 30 in a position behind the light receiving window 9, so the photo sensor 34 receives the reflected light from the subject. The photo sensor 34 is connected to a flash light control circuit 38, as shown in FIGS. 3 and 4, so the flash light control circuit 38 controls the amount of the flash light projected from the flash projector 7 in accordance with the amount of the reflected light as measured through the photo sensor 34, as described in detail below.

The flash light control circuit 38 is constituted of a drive voltage generating circuit 40, a photo sensing section 41, a switching voltage generating circuit 42, a three-terminal thyristor (SCR) 43, a capacitor 44, a switching circuit 45 and other minor elements. The flash light control circuit 38 is connected in parallel to the main capacitor 35 and the flash discharge tube 46.

The drive voltage generating circuit 40 consists of a capacitor 40a, a resistor 40b and a Zener diode 40c, which are connected in series to each other between opposite terminals of the main capacitor 35. A cathode of the Zener diode 40c is connected to the minus terminal of the main capacitor 35 through a not-shown rectifying diode. The capacitor 40a is charged with an output current from the booster circuit 36, while the main capacitor 35 is being charged, such that the voltage across the capacitor 40a is equal to the voltage across the main capacitor 35. As the capacitor 40a is charged, the potential at an anode of the Zener diode 40c get lowered. When the main capacitor 35 starts discharging through the flash discharge tube 46, the capacitor 40a also starts discharging through the flash discharge tube 46, the Zener diode 40c and the resistor 40b in a direction to let a Zener current flow through the Zener diode 40c.

In this embodiment, the Zener diode 40c has a Zener voltage of 6V or so. While the capacitor 40a is discharging, the Zener diode 40c generates the same voltage as the Zener voltage across its opposite electrodes, and in that case the potential at the cathode of the Zener diode 40c is higher than that at the anode. This voltage generated across the Zener diode 40c is used for activating the flash light control circuit 38.

The photo sensing section 41 consists of the photo sensor 34, a capacitor 47, and resistors 48, 49 and 50. In this embodiment, the photo sensor 34 is a photo transistor whose collector is connected to the cathode of the Zener diode 40c through the resistor 50. The resistors 48 and 49 and the capacitor 47 are connected in series between an emitter of the photo sensor 34 and the anode of the Zener diode 40c. A connecting point between the resistors 48 and 49 is connected through the resistor 50 to the anode of the Zener diode 40c. The photo sensor 34 conducts a photoelectric current whose amount corresponds to an amount of light reflected from the subject and falling on the photo sensor 34. The capacitor 47 is charged with the photoelectric current. That is, the capacitor 47 converts the light amount received by the photo sensor 34 into a voltage.

The switching circuit 45 consists of a couple of transistors 45a and 45b. A base of the transistor 45a and a collector of the transistor 45b are connected to a connecting point between the resistors 48 and 49. A collector of the transistor 45a is connected to a base of the transistor 45b, and an emitter of the transistor 45a is connected to the anode of the Zener diode 40c. An emitter of the transistor 45b is connected to the cathode of the Zener diode 40c through a resistor 51. When the voltage charged across the capacitor 47 reaches a reference voltage, the transistors 45a and 45b are turned on, and thus the switching circuit 45 is turned on. A capacitor 45c is provided for preventing electric noises from unexpectedly turning on the switching circuit 45.

The ON-voltage generating circuit 42 consists of a capacitor 42a and a resistor 42b which are connected in series to each other. The other terminal of the capacitor 42a is connected to the anode of the Zener diode 40c, and the other terminal of the resistor 42b is connected to the cathode of the Zener diode 40c. The capacitor 42a is charged with a current conducted through the resistor 42b when the voltage is generated across the Zener diode 40c. When the switching circuit 45 is turned on, the capacitor 42a discharges through the resistor 42b, the resistor 51 and the switching circuit 45, generating a gate voltage across the resistor 42b. The gate voltage turns on the thyristor 43.

A gate and a cathode of the thyristor 43 are connected to opposite ends of the resistor 42b, and an anode of the thyristor 43 is connected to the plus terminal of the main capacitor 35 through a resistor 52. That is, the charge voltage of the main capacitor 35 is applied across the anode and cathode of the thyristor 43, and the gate voltage generated across the resistor 42b is applied across the gate and cathode of the thyristor 43.

When the thyristor 43 is turned on by the gate voltage, the thyristor 43 begins to conduct current from the anode to the cathode. Then, the main capacitor 35 begins to discharge through the thyristor 43 rather than the flash discharge tube 46, because the thyristor 43 has a lower impedance than the flash discharge tube 46. As a result, the voltage across the flash discharge tube 46 goes below a level necessary for the discharging operation of the flash discharge tube 46, so the flash discharge tube 46 stops emitting the flash light. The thyristor 43 is turned off when the charge voltage of the main capacitor 35 is lowered to a predetermined level.

Consequently, when the charge voltage of the capacitor 47 of the photo sensing circuit 41 reaches the reference voltage, the switching circuit 45 is turned on, and thus the thyristor 43 is turned on, so the flash light is turned off.

As described above, the capacitor 42a of the switching voltage generating circuit 42 is charged by the Zener current that flows through the resistor 42b when the Zener voltage is generated across the Zener diode 40c. Because of the resistor 42b, it takes a certain time to charge up the capacitor 42a. On the other hand, in order to turn on the thyristor 43, the capacitor 42a is required to be charged up to a sufficient level for generating the gate voltage across the resistor 42b by the time when the switching circuit 45 is turned on. However, where the subject distance is pretty short, or the reflection factor of the subject is high, the reflection light from the subject will have such a high intensity that the switching circuit 45 could be turned on before the capacitor 42a is charged up to the level necessary for the gate voltage.

For the purpose of avoiding this problem, the flash light control circuit 38 is provided with the capacitor 44. The capacitor 44 is connected between the anode of the Zener diode 40c and a connecting point of the resistor 51 with the photo sensor 34, so the capacitor 44 is charged through the resistor 51 with the voltage across the Zener diode 40c. That is, the capacitor 44 is connected in parallel to the photo sensing section 41, so the same voltage as the voltage across the capacitor 44, i.e. the charge voltage of the capacitor 44, is applied as a drive voltage to the photo sensing section 41.

The capacitor 44 starts being charged gradually from when the flash discharge tube 46 starts emitting the flash light, and is charged up to a maximum level in a predetermined delay time. The maximum level of the charge voltage of the capacitor 44 is equal to the voltage across the Zener diode 40c that is necessary for activating the photo sensing section 41. In this way, the drive voltage applied to the photo sensing section 41 is suppressed to be lower than the voltage across the Zener diode 40c for the predetermined delay time from the start of flashing. In result, the sensitivity of the photo sensing section 41 is suppressed. Concretely, as the suppressed voltage is applied to the photo sensing section 41, less current flows through the photo sensor 34, so it takes more time for the capacitor 47 to reach the reference voltage, in comparison with a case where the drive voltage applied to the photo sensing section 41 is maintained in the maximum level from the start of flashing. Thereby, the capacitor 42a is ensured to be charged up to the level enough for turning on the thyristor 43 when the capacitor 47 reaches the reference voltage, and thus the switching circuit 45 is turned on.

The delay time for suppressing the drive voltage to the photo sensing section 41 may be adjusted by adjusting capacitance of the capacitor 44 and resistance of the resistor 51, and is determined depending upon the gate voltage for the thyristor 43, capacitance of the capacitor 42a, resistance of the resistor 42b and so forth. In that case, with an increase in resistance of the resistor 51, the delay time is elongated.

However, the resistance 51 has a function to limit the current applied to the gate of the thyristor 43 as it is discharged from the capacitor 42a, and also limit the gate voltage in cooperation with the resistor 51. Therefore, the resistance of the resistor 51 should be determined considering these functions as well as the time delaying function.

Figure 5:
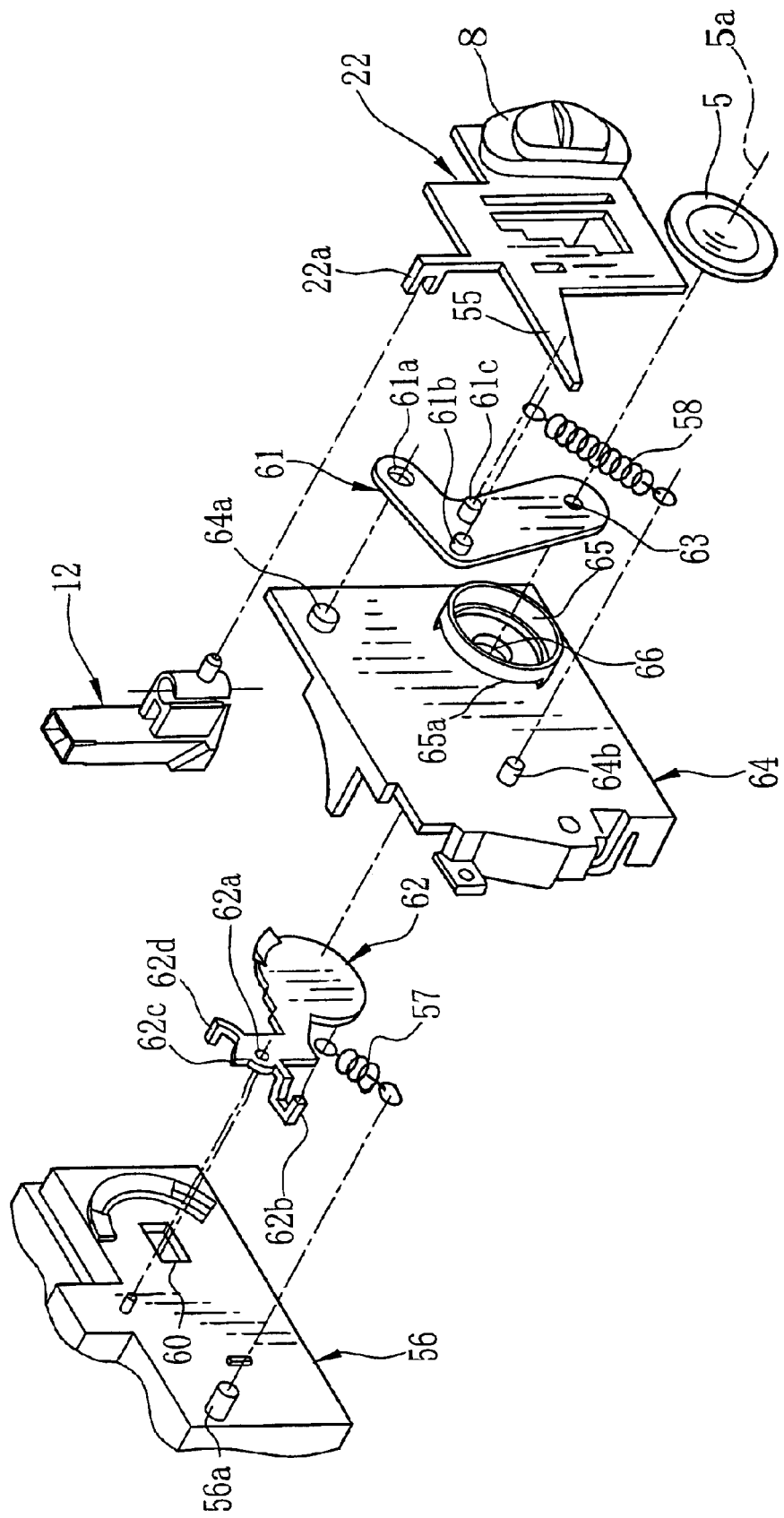
FIG. 5 is an exploded perspective view of a shutter mechanism and a stop changing mechanism of the first embodiment.

Reference is now made to FIG. 5 for showing essential parts of an exposure mechanism of the mechanism unit 26 and the switching plate 22. The switching plate 22 is engaged with the charge condition indicator 12 through an engaging arm 22a, so the charge condition indicator 12 protrudes upward from the unit body 2 as the flash ON-OFF knob 8 is slid up to the flash ON position. The charge condition indicator 12 is mounted on one side of the mechanism unit 26 so as to be able to slide up and down. The charge condition indicator 12 is a light guide made of a transparent plastic, and conducts light from a not-shown light emitting element that is connected to the flash circuit and emits light when the main capacitor 35 is charged up. The switching plate 22 also has a switching arm 55 that protrudes toward the mechanism unit 26.

A shutter blade 62 of the mechanism unit 26 is mounted on a front wall of a light-shielding chamber 56 of the unit main body 17, so as to swing about a pivot hole 62a between a closed position for closing a shutter aperture 60 that is formed through the light-shielding chamber 56, and an opening position for opening up the shutter aperture 60. A shutter spring 57 is suspended between a pin 56a on the front of the light-shielding chamber 56 and a hook 62b of the shutter blade 62, to urge the shutter blade 62 to swing to the closed position. Upon the shutter button 10 being pressed, a not-shown shutter driving member pushes a top claw 62c of the shutter blade 62 to the right side in FIG. 5, so the shutter blade 62 swings clockwise to the opening position against the urging force of the shutter spring 57. Thereafter, the shutter blade 62 returns to the closed position according to the force of the shutter spring 57. In this way, the shutter aperture 60 is opened for a predetermined time, e.g. 1/80 seconds.

The shutter blade 62 is also provided with a pushing arm 62d that pushes the synchronized flash trigger switch 31 of the flash unit 18 as the shutter blade 62 swings to the open position. Thus, the flash light is projected in synchronism with the shutter release operation.

A shutter cover plate 64 is mounted in front of the light-shielding chamber 56, and covers the shutter blade 62. The shutter cover plate 64 is formed with a lens barrel portion 65 for accepting the taking lens 5 therein, and a large stop aperture 66 is formed inside the lens barrel portion 65 concentrically with an optical axis 5a of the taking lens 5. A stop blade 61 is mounted on a front portion of the lens holder 64. The stop blade 61 is an substantially L-shaped member, and has a pivot hole 61a in one end and a small stop aperture 63 in the other end. The pivot hole 61a is fitted on a pivot pin 64a that is formed on the front of the shutter cover plate 64, so the stop blade 61 may swing about the pivot pin 64a.

Figure 6A:
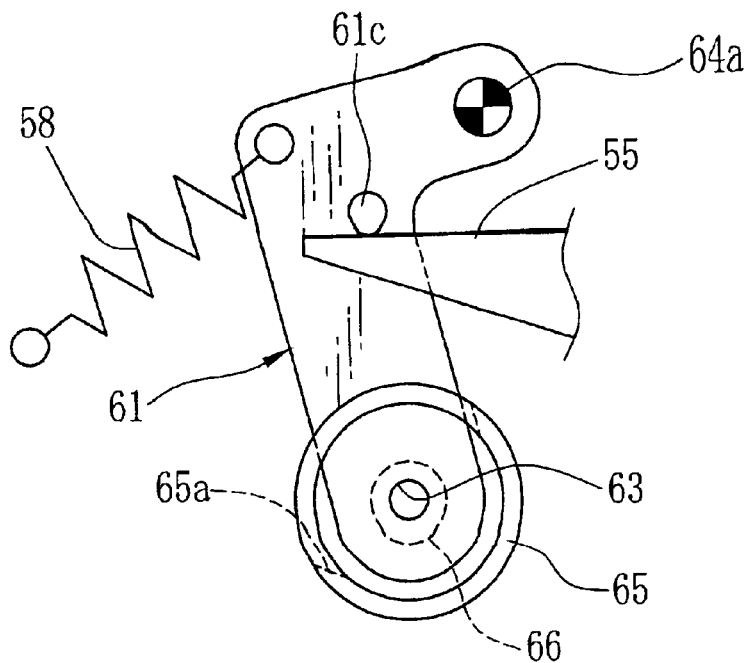
FIGS. 6A and 6B are explanatory diagrams illustrating two switching positions of the stop changing mechanism of the first embodiment.
Figure 6B:
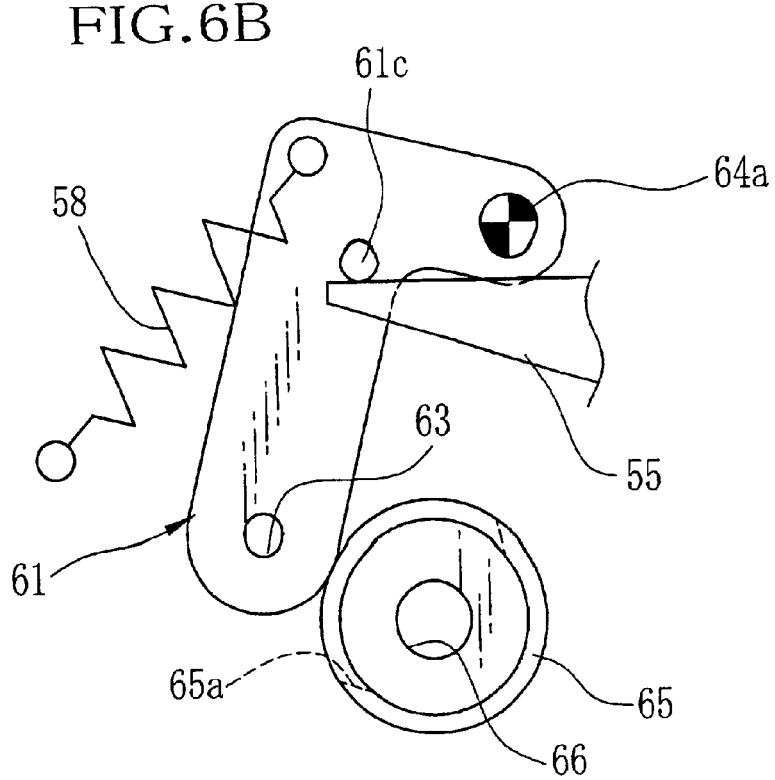

A slit 65a is formed through a limited angular range of the lens barrel portion 65, for letting the end with the small stop aperture 63 of the stop blade 61 enter inside the lens barrel portion 65. A spring 58 is suspended between a pin 64b on the shutter cover plate 64 and a pin 61b on the stop blade 61, to urge the stop blade 61 to swing in a counterclockwise direction in FIG. 5, so the small stop aperture 63 is held in front of the large stop aperture 66 according to the force of the spring 58, as shown in FIG. 6A. The stop blade 61 is provided with a second pin 61c, and the switching arm 55 of the switching plate 22 is in contact with a bottom side of the second pin 61c, as shown in FIGS. 6A and 6B. As the flash ON-OFF knob 8 is slid up to the flash ON position, the switching arm 55 pushes up the stop blade 61 at the pin 61c, so the end with the small stop aperture 63 is moved out of the lens barrel portion 65, as shown in FIG. 6B, against the force of the spring 58. Thus, only the large stop aperture 66 is placed on the optical axis 5a of the taking lens 5.

In this embodiment, the f-number of the taking lens 5 is f/6.7 with the large stop aperture 66, i.e. when the flash ON-OFF knob 8 is set to the flash ON position. On the other hand, when the flash ON-OFF knob 8 is set to the flash OFF position, and thus the small stop aperture 63 is inserted in the light path of the taking lens 5, the f-number becomes f/12.3.

Now the operation of the above embodiment will be briefly described.

While the film unit 2 is not used, the flash ON-OFF knob 8 is set to the lower flash OFF position, where the charge switch 32 of the flash unit 18 is OFF, and the charge condition indicator 12 is located inside the unit body 3. Also the stop blade 61 is held by the force of the spring 58 in the position shown in FIG. 6A, where the small stop aperture 63 is on the optical axis 5a of the taking lens 5.

Prior to taking a picture, the photographer decides whether to use the flash light or not. If not, the photographer maintains the flash ON-OFF knob 8 in the flash OFF position, and presses the shutter button 10 while looking into the finder eyepiece window 21c to frame a subject. Then, the shutter driving member kicks the top claw 62c of the shutter blade 62, so the shutter blade 62 swings to open the shutter aperture 60 for the predetermined time.

If the photographer decides to use the flash light, the photographer slides the flash ON-OFF knob 8 up to the flash ON position, as shown in FIG. 1. Then the charge switch 32 is turned on, activating the booster circuit 36 to charge the main capacitor 35. Also the charge condition indicator 12 protrudes upward from the unit body 3. When the main capacitor 35 is fully charged, the light emitting element of the flash circuit emits light, that is projected through the charge condition indicator 12 out of the unit body 3, indicating the completion of charging.

As the flash ON-OFF knob 8 is slid up, the switching plate 22 moves up, so the switching arm 55 pushes up the second pin 61c of the stop blade 61, thereby causing the stop blade 61 to swing clockwise. In result, the small stop aperture 63 is displaced from the light path of the taking lens 5, so the large stop aperture 66 alone remains on the optical axis 5a of the taking lens 5.

Thereafter when the shutter button 10 is pressed, the shutter blade 62 swings to open the shutter aperture 60 for the predetermined time in the same way as described above. Simultaneously, the pushing arm 62d of the shutter blade 62 pushes to turn on the synchronized flash trigger switch 31 of the flash unit 18, so the trigger circuit 37 applies the trigger voltage to the flash discharge tube 46 of the flash projector 7. Then, the voltage charged across the main capacitor 35 is discharged through the flash discharge tube 46, causing the flash discharge tube 46 to emit light. The light from the flash discharge tube 46 is projected as the flash light from the flash projector 7 toward the subject.

A fragment of the flash light is reflected from the subject, and enters through the light receiving window 9, and falls on the photo sensor 34. The photo sensor 34 conducts photoelectric current of an amount that corresponds to the amount of incident light. The photoelectric current is charged in the capacitor 47 of the flash light control circuit 38, so the flash light control circuit 38 stops the flash discharge tube 46 from emitting when the charge voltage of the capacitor 47 reaches the reference voltage. In this way, the flash light automatically stops when the amount of light reflected from the subject reaches a predetermined limit, so the image of the subject photographed on the photo filmstrip 25 is prevented from being overexposed even where the subject exists in a near range, e.g. from 1 m to 2 m, or the reflection factor of the subject is pretty high. Furthermore, since the large stop aperture 66 is used for the flash photography, both the main subject and the background are photographed in adequate exposure conditions.

After taking a photograph in this way, the film winding wheel 13 is rotated to wind the exposed portion of the photo filmstrip 25 into the cartridge shell 24, and thus place an unexposed portion of the photo filmstrip 25 behind the taking lens 5 for the next photography.

Although the film speed of the photo filmstrip 25 is ISO 800, and the capacitance of the main capacitor 35 is 50 $\mu$F in the above embodiment, these values may be modified appropriately. For example, the film speed may be ISO 1600 or ISO 3200. Where the shutter speed is 1/80 seconds, like the above embodiment, and the film speed is ISO 1600, it is preferable to set the f-number with the large stop aperture in a range from f/5.6 to f/8, the f-number with the small stop aperture at f/18, and the capacitance of the main capacitor 35 in a range from 30 $\mu$F to 60 $\mu$F. Thereby, overexposure of a main subject located in the near range is surely prevented in the flash photography. Also in the photography without flash, these numerical values are effective for avoiding super-over-exposure or super-under-exposure. The same effects are achieved where the shutter speed is 1/80 seconds and the film speed is ISO 3200, by setting the f-number with the large stop aperture in a range from f/5.6 to f/8, the f-number with the small stop aperture at f/26, and the capacitance of the main capacitor 35 in a range from 20 $\mu$F to 40 $\mu$F.

Figure 7:
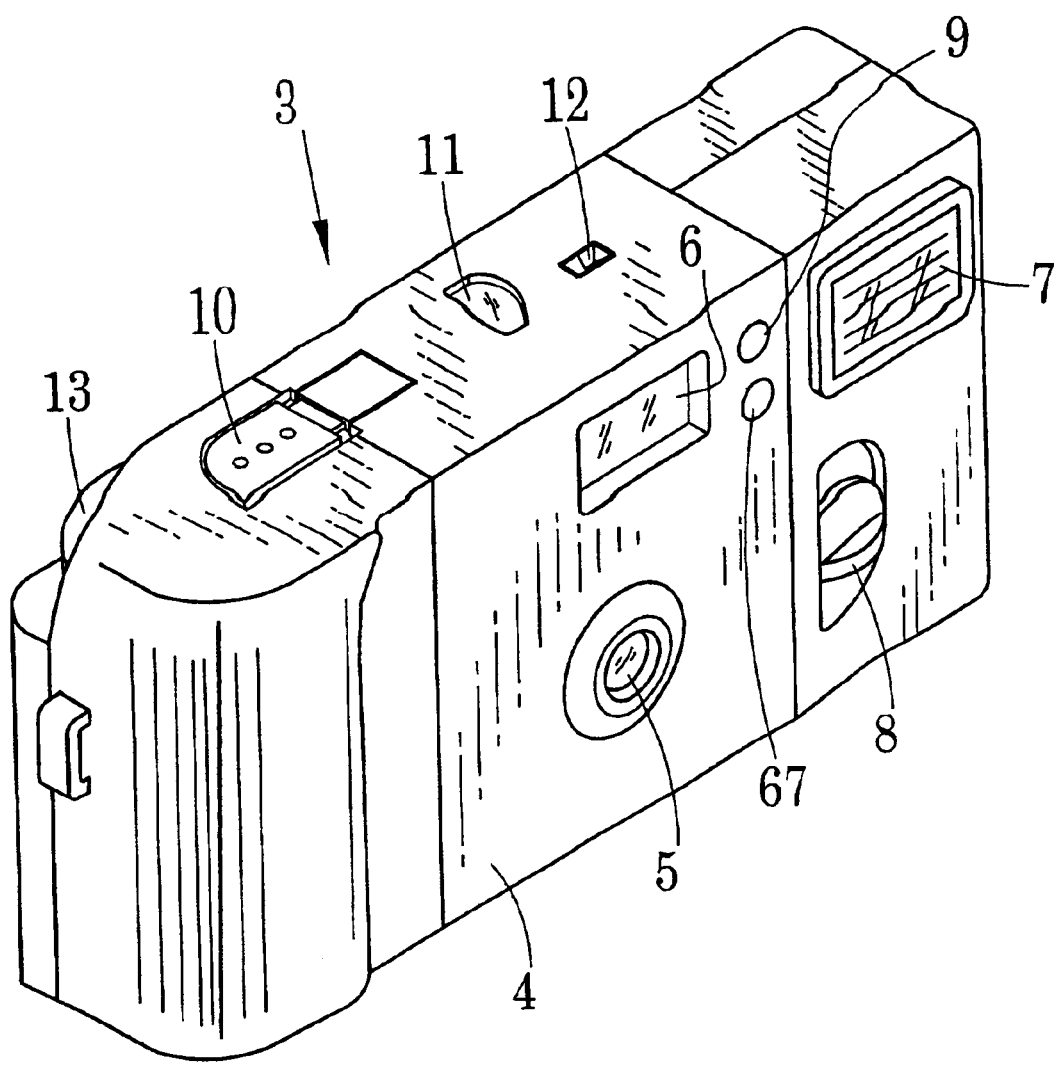
FIG. 7 is a perspective view of a film unit according to a second embodiment of the present invention.

FIG. 7 shows a film unit according to a second embodiment of the present invention. Fundamental structures of the film unit of the second embodiment are equivalent to those of the first embodiment, so the same reference numerals are used for the equivalent parts of the film unit, and the following description relates only to those elements essential for the second embodiment.

Figure 8:
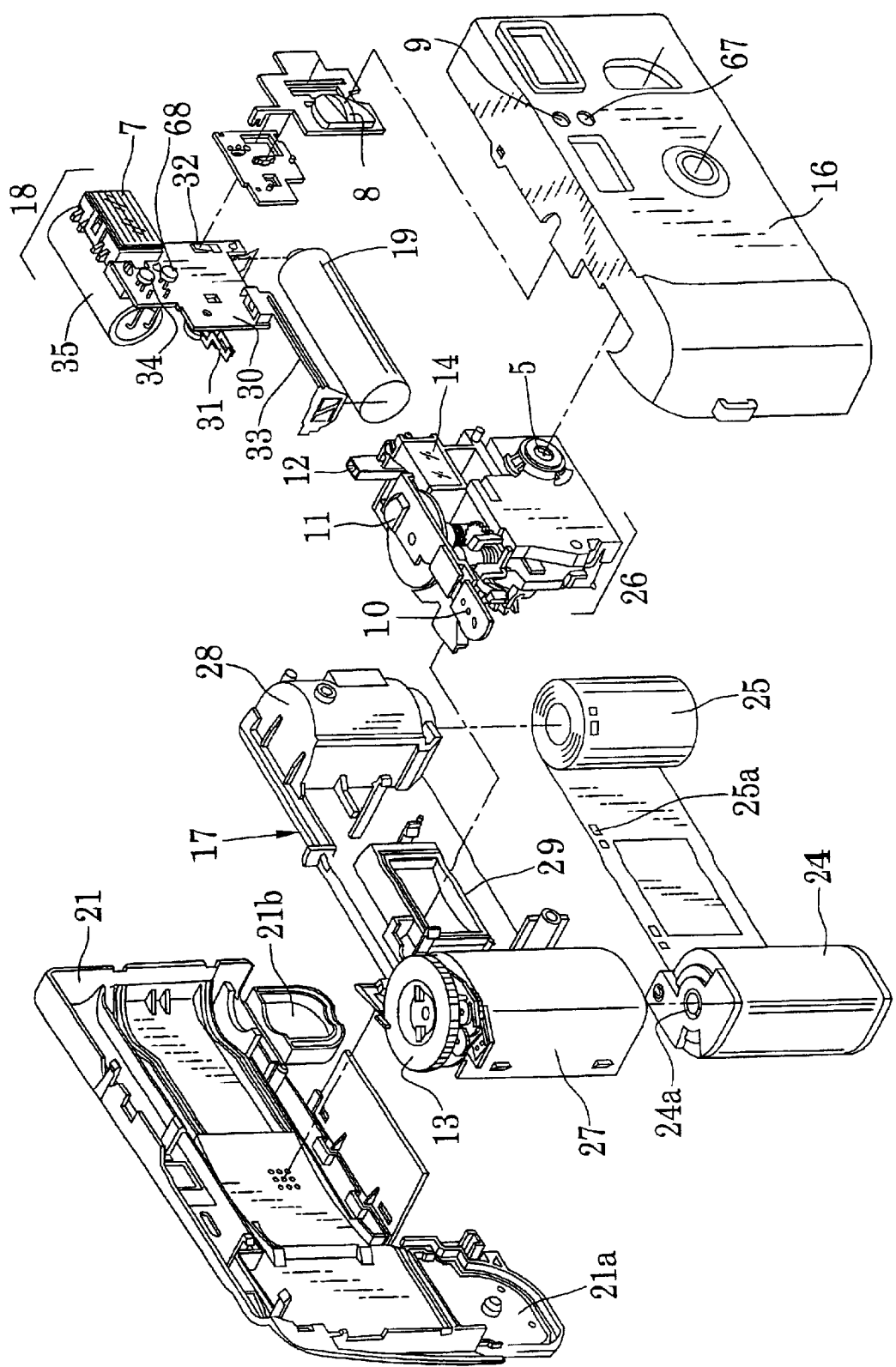
FIG. 8 is an exploded perspective view of a unit body of the film unit of the second embodiment.

In FIG. 7, a flash ON-OFF knob 8 is in a flash OFF position, so a charge condition indicator 12 is located inside a unit body 3. In the second embodiment, a second light receiving window 67 is provided below a light receiving window 9. As shown in FIG. 8, a photo sensor 34, e.g. a photo transistor, is disposed behind the light receiving window 9, to measure the amount of light that is reflected from a subject and enters through the light receiving window 9 while a flash projector 7 is projecting a flash light toward the subject. Like the first embodiment, the photo sensor 34 is a part of a flash light control circuit that is provided on a printed circuit board 30 of a flash unit 18, and is connected to a flash circuit. The flash light control circuit and the flash circuit are configured in the same way as shown in FIGS. 3 and 4, and operate in the same way as described with respect to the first embodiment, so the detailed descriptions of these circuits are skipped.

Figure 9:
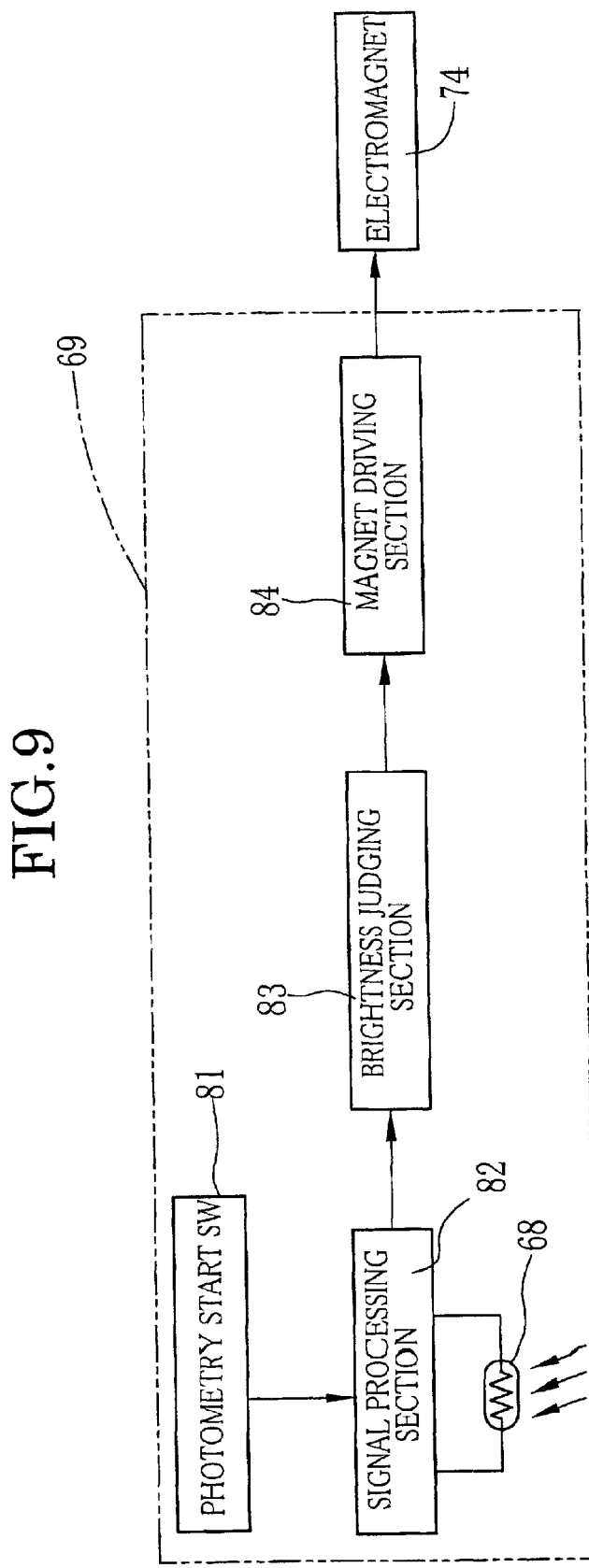
FIG. 9 is a functional block diagram illustrating relations between respective sections of a photometric circuit and an electromagnet of a stop changing mechanism of the second embodiment.

Behind the second light receiving window 67 is disposed a second photo sensor 68. The second photo sensor 68 is a part of a photometric circuit 69, as shown in FIG. 9, that is activated to measure brightness of a subject when a shutter button 10 is pressed to make an exposure, in order to switch over the f-number depending upon the measured subject brightness, as set forth in detail below.

The film unit of the second embodiment uses a photo filmstrip 25 whose film speed is ISO 1600, and a main capacitor 35 of the flash unit 18 has a capacitance of 80 $\mu F$ so that the flash light from the flash projector 7 reaches a distance of about 5 m.

Figure 10:
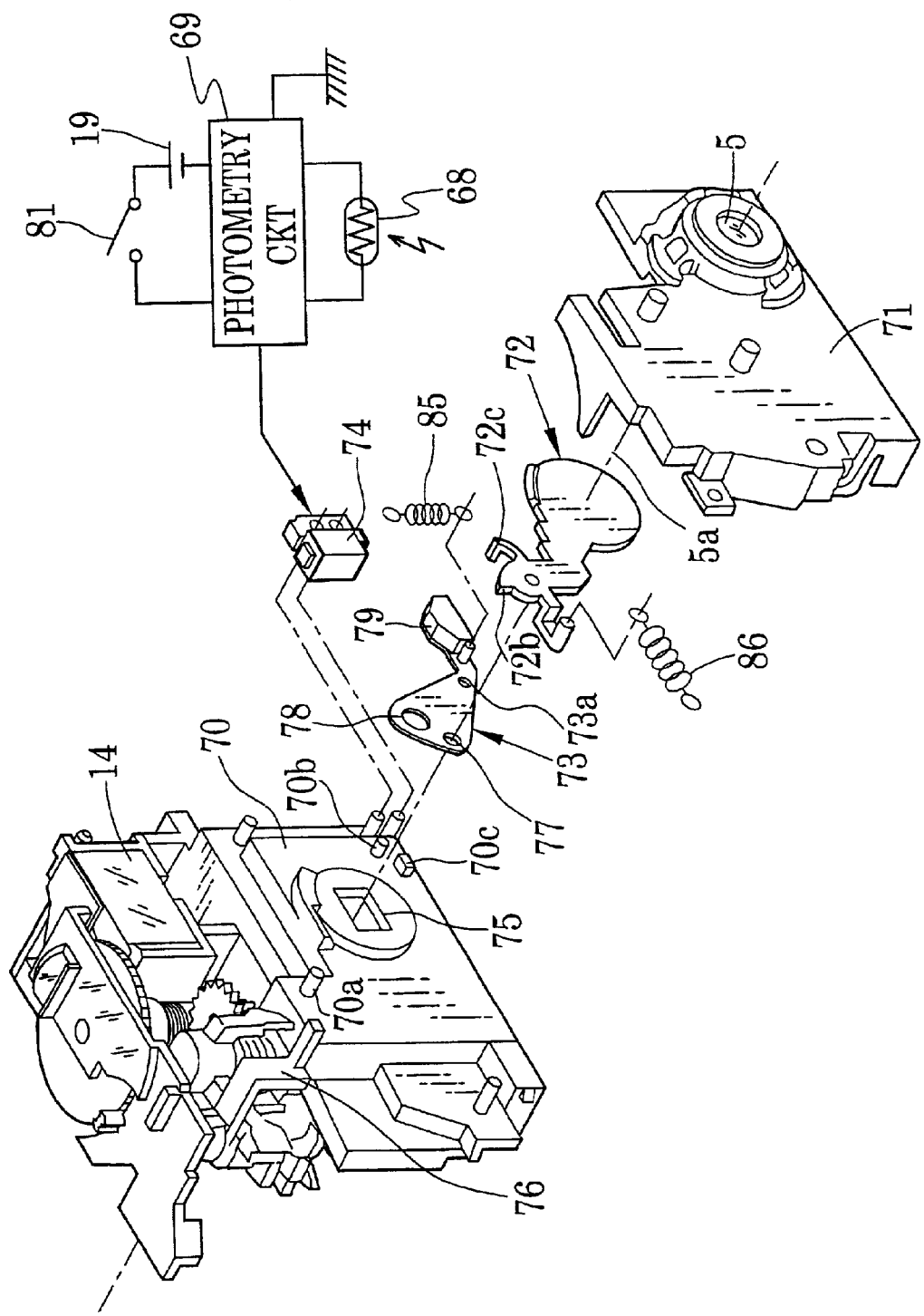
FIG. 10 is an exploded perspective view of a shutter mechanism and the stop changing mechanism of the second embodiment.

FIG. 10 shows an exposure mechanism of a mechanism unit 26 that is mounted in front of an exposure aperture 29 of a main body portion 17 of the unit body 3. A shutter blade 72 is mounted on a front wall of a light-shielding chamber 70 by fitting a pivot hole 72a on a pivot pin 70a, so as to be able to swing about the pivot pin 70a. The shutter blade 72 is covered with a shutter cover plate 71 that doubles as a lens holder for holding a taking lens 5. A shutter spring 86 urges the shutter blade 72 to stay in a closed position where the shutter blade 72 closes a shutter aperture 75 that is formed through the front wall of the light-shielding chamber 70. When the shutter button 10 is pressed, a shutter drive lever 76 kicks a top claw 72b of the shutter blade 72 in a direction to cause the shutter blade 72 to swing clockwise in FIG. 10 against the force of the shutter spring 86, opening the shutter aperture 75. Thereafter, the shutter blade 72 returns to the closed position according to the force of the shutter spring 86. Thus, the shutter aperture 75 is opened for a predetermined time. In this embodiment, the shutter speed is set at $\frac{1}{100}$ seconds.

Figure 11A:
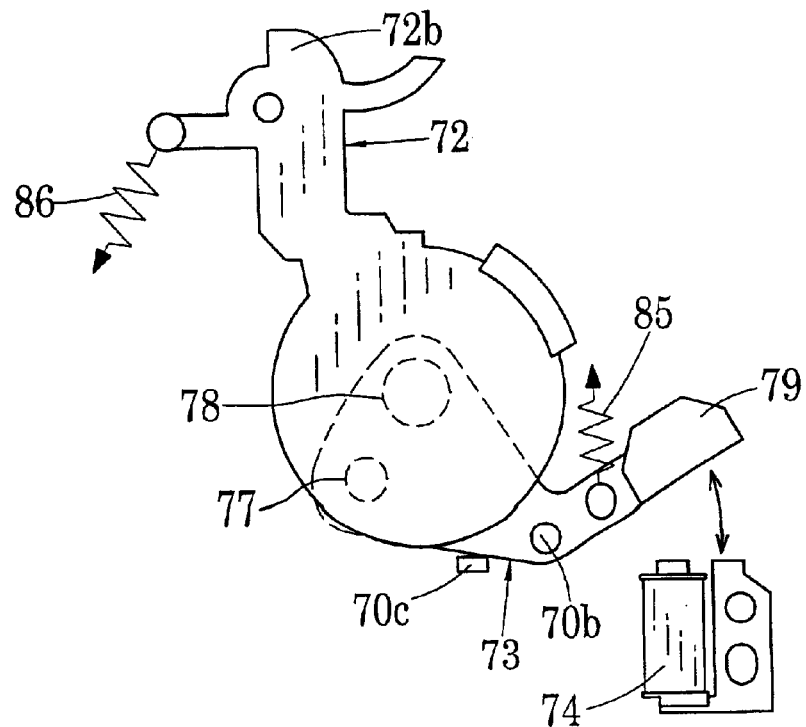
FIGS. 11A and 11B are explanatory diagrams illustrating two switching positions of the stop changing mechanism of the second embodiment.

A stop blade 73 is placed behind the shutter blade 72, and is mounted on the light-shielding chamber 70 by fitting a pivot hole 73a on a pivot pin 70b so as to be rotatable about the pivot pin 70b. The stop blade 73 is formed with a small stop aperture 77 and a large stop aperture 78. The stop blade 73 is urged by a spring 85 to stay in contact with a stop protrusion 70c that is formed integrally on the front wall of the light-shielding chamber 70. Where the stop blade 73 is in contact with the stop protrusion 70c, the large stop aperture 78 is on an optical axis 5a of the taking lens 5, as shown in FIG. 11A. An iron segment 73b is mounted on an opposite end of the stop blade 73 from the stop apertures 77 and 78.

An electromagnet 74 is mounted on the light-shielding chamber 70 in the vicinity of the iron segment 73b carried on the stop blade 73. The electromagnet 74 is connected to the photometric circuit 69, and is driven by a magnet driving section 84 of the photometric circuit 69. The photometric circuit 69 is constituted of the second photo sensor 68, a photometry start switch 81, a signal processing section 82, a brightness judging section 83 and the magnet driving section 84.

For example, the second photo sensor 68 is a CdS cell whose resistance varies with the received light amount. The signal processing section 82 is activated when the photometry start switch 81 is turned on, and produces a photometric signal from a resistance value of the second photo sensor 68. For example, the brightness judging section 83 is a comparator that compares a voltage of the photometric signal from the signal processing section 82 with a reference voltage. When the voltage of the photometric signal is higher than the reference voltage, the brightness judging section 83 outputs a drive signal to the magnet driving section 84. For example, the magnet driving section 84 is a transistor that conducts current through the electromagnet 74 in response to the drive signal from the brightness judging section.

Figure 11B:
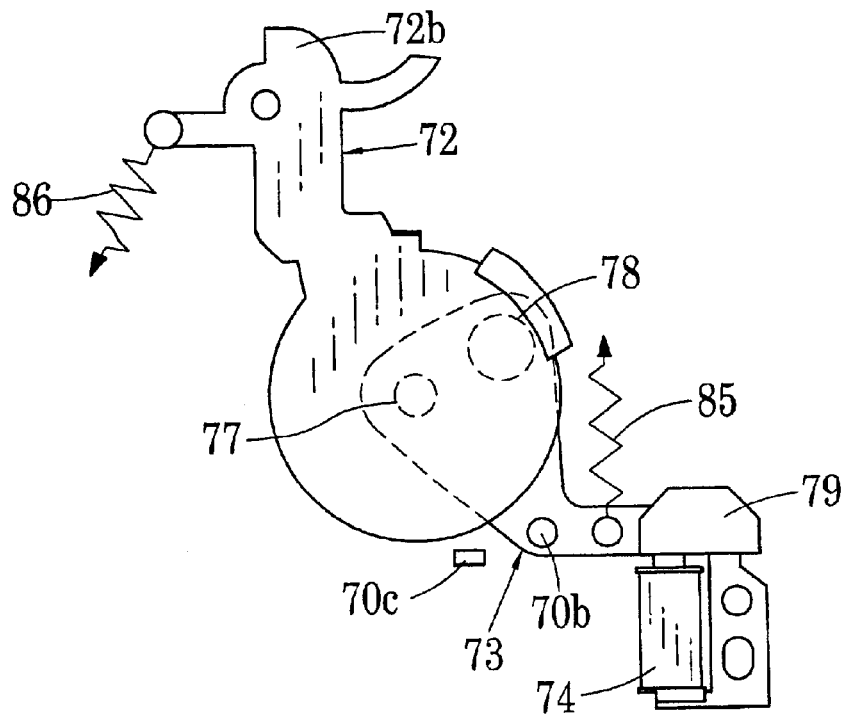

While the current flows through the electromagnet 74, a magnetic field is generated around the electromagnet 74, that attracts the iron segment 73b to the electromagnet 74. Thus, the stop blade 73 rotates against the force of the spring 85 to a position where the iron segment 73b contacts the electromagnet 74, and the small stop aperture 77 is on the optical axis 5a of the taking lens 5, as shown in FIG. 11B.

Figure 12:
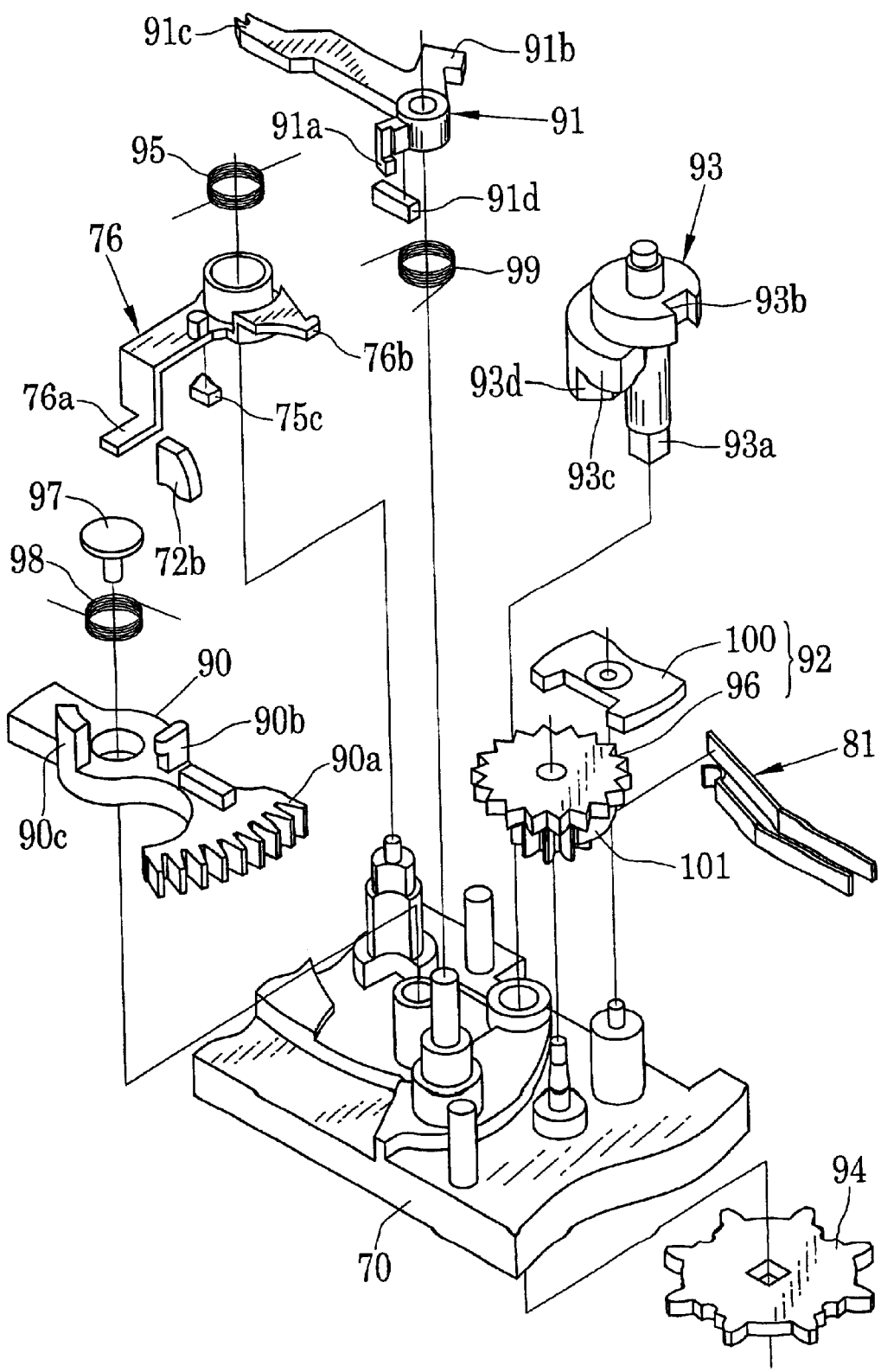
FIG. 12 is an exploded perspective view of a shutter mechanism of the second embodiment.

The photometry start switch 81 is turned by a shutter mechanism of the mechanism unit 26 when the shutter button 10 is pressed. As shown in FIG. 12, the shutter mechanism is constituted of the shutter drive lever 76, a delay lever 90, a release lever 91, a governor mechanism 92, a cam member 93, and a sprocket wheel 94, which are rotatably mounted on a top side of the light-shielding chamber 70.

The cam member 93 has a round disc with a notch 93a and a semi-circular cam disc having an upper projection 93b and a lower projection 93c. The upper projection 93b comes to contact with the shutter drive lever 76, and the lower projection 93c comes to contact with the delay lever 90. A rotary shaft of the cam member 93 is engaged at its bottom end with the sprocket wheel 94, so as to rotate together with the sprocket wheel 94. The sprocket wheel 94 is located inside the light-shielding chamber 70, and interlocks with perforations 25a of the photo filmstrip 25 (see FIG. 8), so the sprocket 94 and the cam member 93 rotate in a counter-clockwise direction in FIG. 12, as the photo filmstrip 25 is rewound into a cartridge shell 24 by rotating a spool 24a through a film winding wheel 13.

The shutter drive lever 76 consists of a shutter driving leg 76a for kicking the top claw 72a of the shutter blade 72, a hook 76b and a projection 76c. A torsion spring 95 is fitted on an upper cylindrical portion of the shutter drive lever 76. One end of the torsion spring 95 is in contact with the shutter drive lever 76, and the other end of the torsion spring 95 is in contact with the light-shielding chamber 70. Thereby, the torsion spring 95 urges the shutter drive lever 76 to rotate counterclockwise in FIG. 12.

The delay lever 90 has a geared end 90a that interlocks with an escapement wheel 96 of the governor mechanism 92, and a first projection 90b and a second projection 90c are formed on the top side of the delay lever 90. The delay lever 90 is mounted to the light-shielding chamber 70 by a rivet 97, and a torsion spring 98 is put on an axle of the rivet 97. One end of the torsion spring 98 is in contact with the first projection 90b of the delay lever 90, and the other end of the torsion spring 98 is in contact with the light-shielding chamber 70. Thereby the torsion spring 98 urges the delay lever 90 to rotate counterclockwise in FIG. 12.

The release lever 91 consists of a driven arm 91a, an engaging hook 91b, a winding lock claw 91c and a bottom projection 91d. One end of a torsion spring 99 is in contact with the driven arm 91a, and the other end of the torsion spring 99 is in contact with the light-shielding chamber 70. Thereby, the torsion spring 99 urges the release lever 91 to rotate clockwise in FIG. 12.

The governor mechanism 92 consists of the escapement wheel 96 and an anchor 100. The anchor 100 controls the rotational speed of the escapement wheel 96. The escapement wheel 96 interlocks with the geared end 90a of the delay lever 90, so the escapement wheel 96 rotates with the delay lever 90. Thus, the governor mechanism 92 controls the rotational speed of the delay lever 90. The escapement wheel 96 is provided with a sector-shaped rib 101 that comes to contact with the photometry start switch 81 only while the escapement wheel 96 is rotating.

Figure 13:
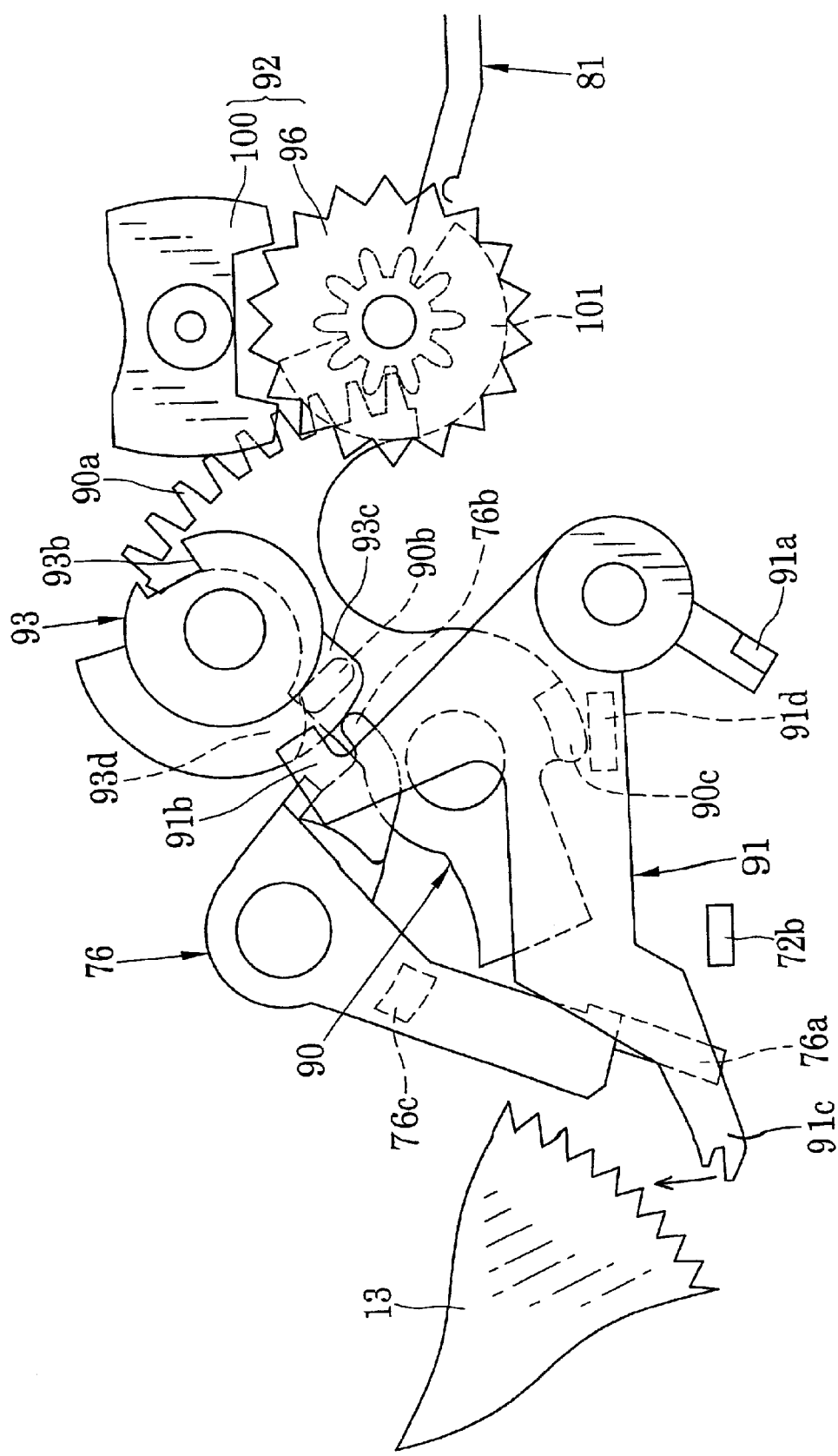
FIG. 13 is a top plan view of the shutter mechanism of FIG. 12 in a position where a shutter drive lever is being rotated toward a charged position.

FIG. 13 shows a position of the shutter mechanism where the shutter drive lever 76 is being rotated toward a charged or cocked position by rotating the winding wheel 13 in the winding direction to wind the photo filmstrip 25 into the cartridge shell 24. As the winding wheel 13 rotates in the winding direction, the cam member 93 rotates together with the sprocket 94 in the counterclockwise direction in FIG. 13. As a result, the upper projection 93b of the cam member 93 comes to contact with the hook 76b of the shutter drive lever 76, and pushes the shutter drive lever 76 to rotate in the clockwise direction against the force of the torsion spring 95, charging the shutter drive lever 76.

Simultaneously, the lower projection 93c of the cam member 93 comes to contact with the first projection 90b of the delay lever 90, and pushes the delay lever 90 to rotate in the clockwise direction against the force of the torsion spring 98. Since the urging force of the torsion spring 99 for the release lever 91 is less than that of the torsion spring 98 for the delay lever 90, the release lever 91 is stopped from rotating in the clockwise direction by the engagement of the bottom projection 91d with the second projection 90c of the delay lever 90.

Figure 14:
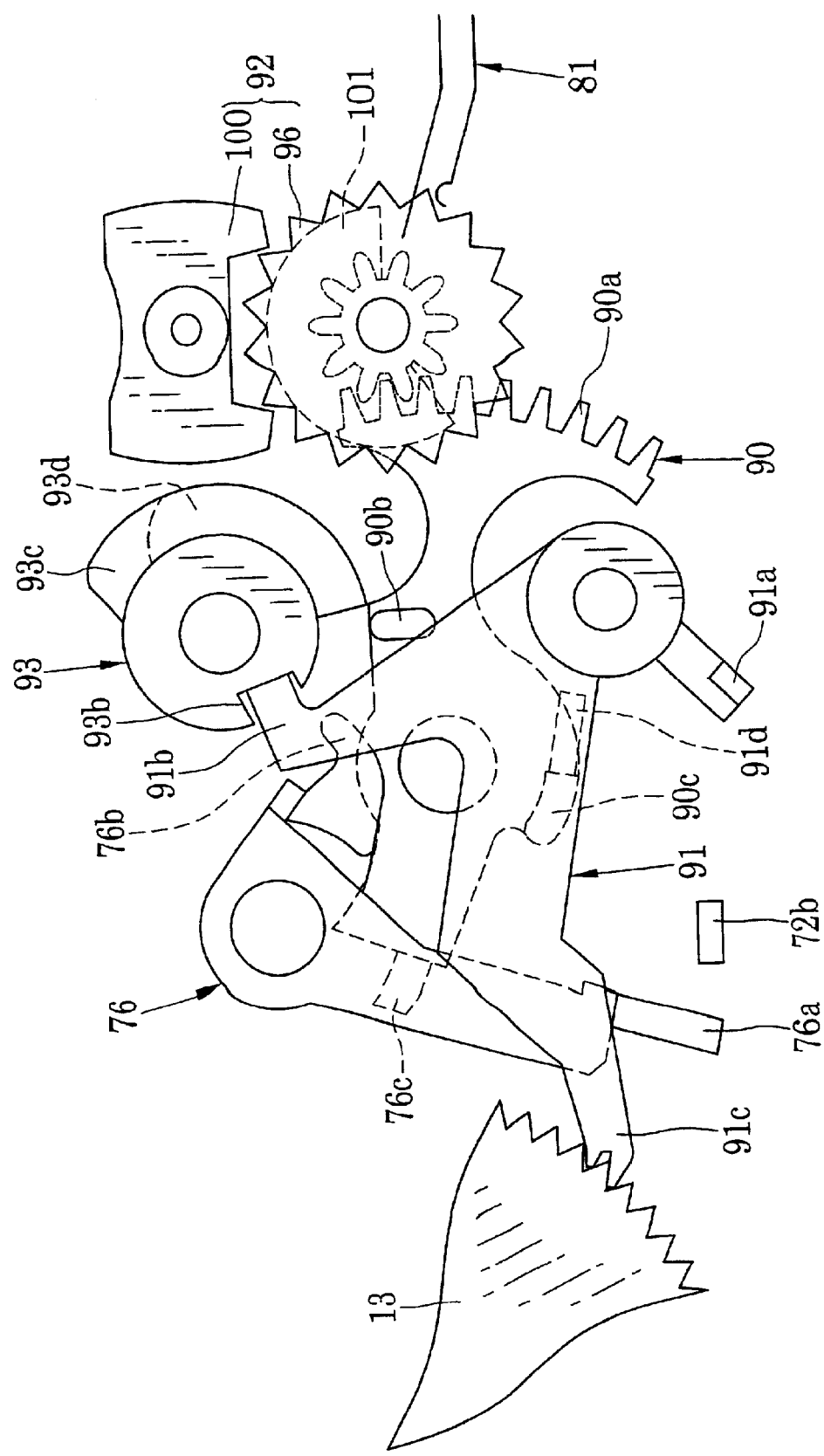
FIG. 14 is a similar view to FIG. 13, but showing the shutter mechanism in the charged position.

When the photo filmstrip 25 is wound up by a length corresponding to one frame, the cam member 93 and the delay lever 90 come to a position as shown in FIG. 14, where the second projection 90c is disengaged from the bottom projection 91d of the release lever 91, so the release lever 91 rotates clockwise according to the force of the torsion spring 99. As a result, the engaging hook 91b of the release lever 91 is engaged in the notch 93a of the cam member 93, and the winding lock claw 91c gears into the winding wheel 13, locking the winding wheel 13 and thus stopping winding the photo filmstrip 25. In this position, the bottom projection 91d of the release lever 91 stands in front of the second projection 90c in the urged rotational direction of the delay lever 90 by the torsion spring 98, so the delay lever 90 is held in this position by the bottom projection 91d. Also the shutter drive lever 76 is held in its cocked position against the force of the torsion spring 95, as the projection 76c of the shutter drive lever 76 is stopped against an end 90d of the release lever 91.

Figure 15:
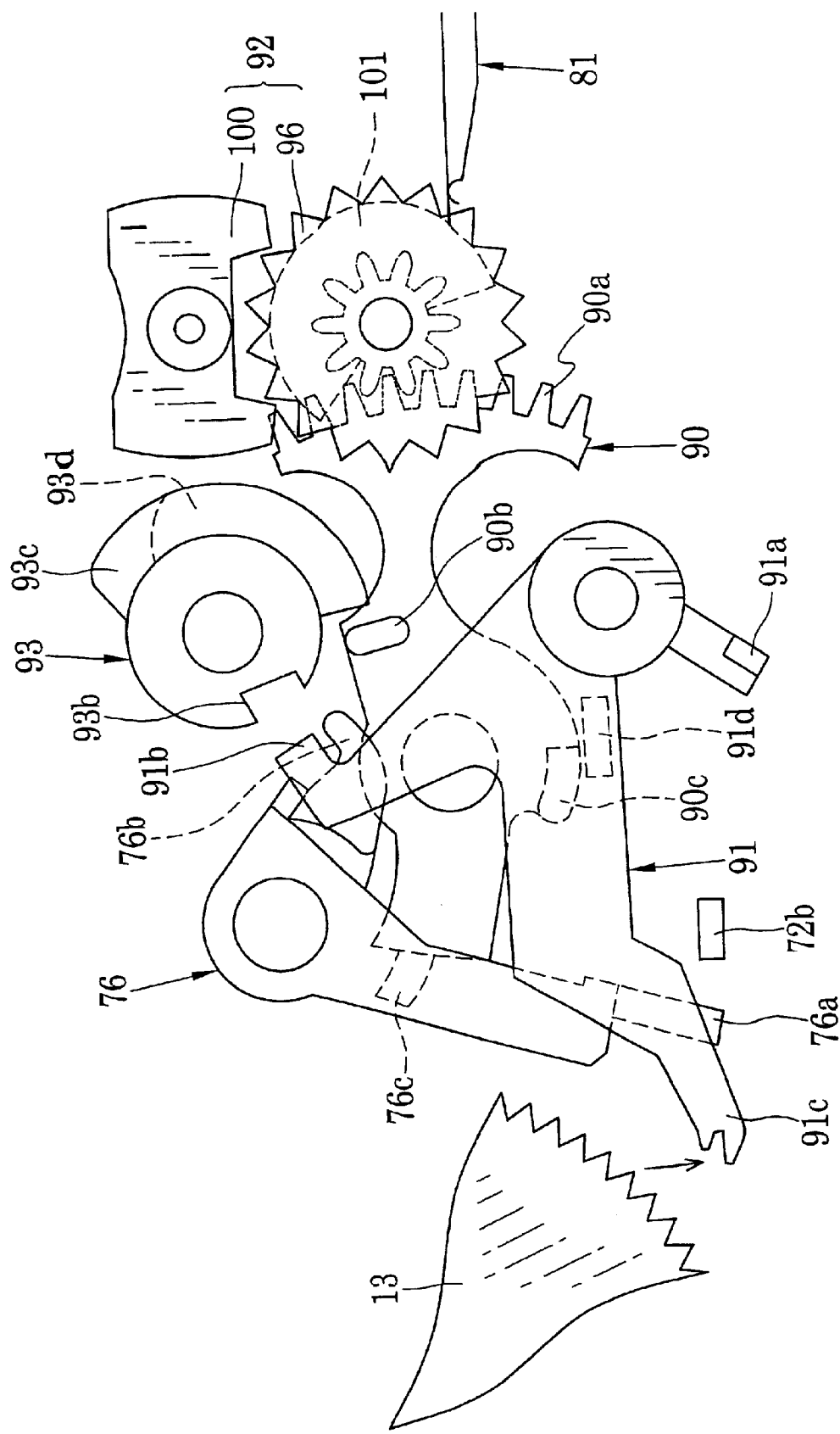
FIG. 15 is a similar view to FIG. 13, but showing a position where a photometry start switch of the photometric circuit is turned on immediately after a shutter button is pressed.

When the shutter button 10 is pressed while the shutter mechanism is in the cocked position shown in FIG. 14, the driven arm 91a is pushed by the shutter button 10 in a direction to rotate the release lever 91 counterclockwise against the force of the torsion spring 99. As a result, the bottom projection 91d of the release lever 91 is set off the second projection 90c of the delay lever 90, as shown in FIG. 15, so the delay lever 90 rotates counterclockwise according to the force of the torsion spring 98. Along with the counterclockwise rotation of the delay lever 90, the escapement wheel 96 rotates clockwise. Then the rib 101 on the escapement wheel 96 pushes to turn on the photometry start switch 81, as shown in FIG. 15. When the photometry start switch 81 is turned on, the shutter drive lever 76 is held in the cocked position as the projection 76c is in contact with the end 90d of the delay lever 90.

Figure 16:
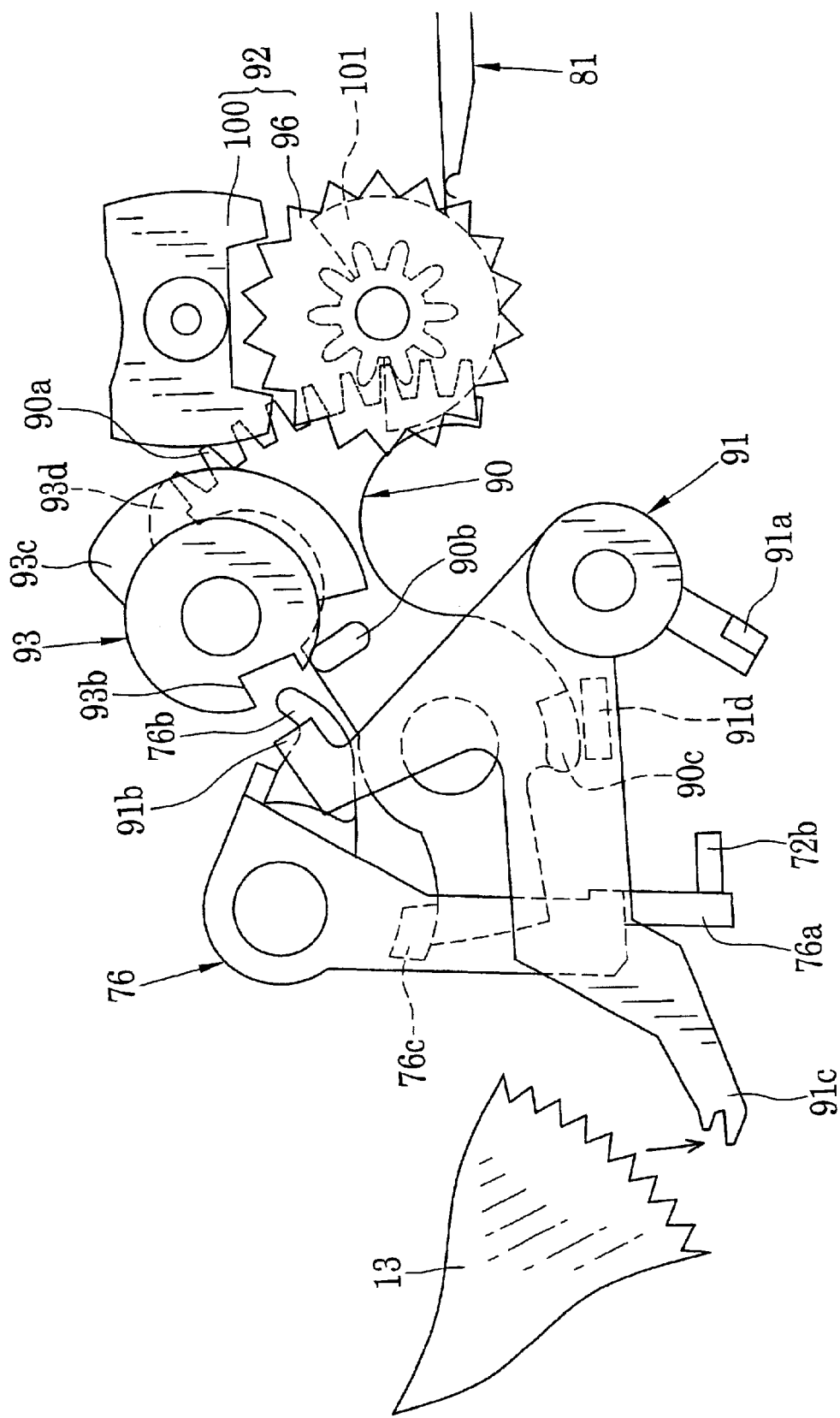
FIG. 16 is a similar view to FIG. 13, but showing a position where the shutter drive lever kicks a shutter blade to make an exposure.

As the delay lever 90 rotates further in the counterclockwise direction, the end 90d of the delay lever 90 moves away from the front of the projection 76c in the urged rotational direction of the shutter drive lever 76. Then, the shutter drive lever 76 rotates counterclockwise according to the force of the torsion spring 95, as shown in FIG. 16. At that time, the shutter drive lever 76a of the shutter drive lever 76 kicks the top claw 72b of the shutter blade 72, causing the shutter blade 72 to swing and open the shutter aperture 75, so the photo filmstrip 25 placed behind the exposure aperture 29 is exposed. The delay lever 90 continues to rotate counterclockwise according to the force of the torsion spring 98 till it reaches the initial position shown in FIG. 13. In this position, the rib 101 removes off the photometry start switch 81, and thus turns off the photometry start switch 81.

In this way, in response to the shutter button 10 being pressed, the photometry start switch 81 is turned on immediately before the shutter drive lever 76 is released from the cocked position. By controlling the rotational speed of the delay lever 90 by the governor mechanism 92, the time interval from the time when the photometry start switch 81 is turned on to the time when the shutter drive lever 76 is released may be adjusted such that the shutter blade 72 starts opening the shutter aperture 75 after the photometric circuit 69 measures the subject brightness through the second photo sensor 68 and, if necessary, switches over the stop blade 73 between the stop apertures 77 and 78 depending upon the measured subject brightness.

Now the operation of the film unit according to the second embodiment will be briefly described.

While the film unit is not used, the flash ON-OFF knob 8 is set to the lower flash OFF position, as shown in FIG. 7, where the charge switch 32 of the flash unit 18 is OFF. Prior to taking a picture, the photographer winds up the film winding wheel 13 to set the shutter mechanism in the cocked position as shown in FIG. 14. Thereafter, if the photographer does not want to use the flash light, the photographer presses the shutter button 10 while leaving the flash ON-OFF knob 8 in the flash OFF position. Upon the shutter button 10 being pressed, the photometry start switch 81 is turned on to activate the photometric circuit 69, as shown in FIG. 9. Then, the subject brightness is measured through the second photo sensor 69, and the signal processing section 82 outputs a photometric signal to the brightness judging section 83 in correspondence with a resistance value of the second photo sensor 68. The brightness judging section 83 compares a voltage of the photometric signal with the reference voltage.

When the voltage of the photometric signal is lower than the reference voltage, the brightness judging section 83 does not output a drive signal to the magnet driving section 84, so any current does not flow through the electromagnet 74. Thus, the large stop aperture 78 is placed on the optical axis 5a of the taking lens 5 according to the force of the spring 85, as shown in FIG. 11A. When the voltage of the photometric signal is higher than the reference voltage, the brightness judging section 83 outputs a drive signal to the magnet driving section 84, so the current flows through the electromagnet 74. Then, the electromagnet 74 attracts the iron segment 73b of the stop blade 73, causing the stop blade 73 to rotate against the force of the spring 85. Where the iron segment 73b comes to contact with the electromagnet 74, as shown in FIG. 11B, the small stop aperture 77 is on the optical axis 5a of the taking lens 5.

After the photometric circuit 69 is activated to switch over the stop blade 73 depending upon the subject brightness, the shutter blade 72 opens and then closes the shutter aperture 75 in the way as described with respect to FIGS. 15 and 16. Since the large stop aperture 78 is used when the subject brightness is lower than a predetermined level, the image of the subject is photographed in an adequate exposure condition, avoiding under-exposure. On the other hand, when the subject brightness is higher than the predetermined level, the small stop aperture 78 is automatically placed on the optical axis 5a of the taking lens 5, so the image of the subject is photographed in an adequate exposure condition, avoiding over-exposure.

If the photographer decides to use the flash light, the photographer slides the flash ON-OFF knob 8 up to the flash ON position. Then the charge switch 32 is turned on, to charge the main capacitor 35. Also the charge condition indicator 12 protrudes upward from the unit body 3. When the main capacitor 35 is fully charged, the light emitting element of the flash circuit emits light, that is projected through the charge condition indicator 12 out of the unit body 3, indicating the completion of charging.

Thereafter when the shutter button 10 is pressed, the photometry start switch 81 is turned on to activate the photometric circuit 69. Thus, either the small stop aperture 77 or the large stop aperture 78 is placed on the optical axis 5a of the taking lens 5 depending upon the subject brightness measured through the second photo sensor 68, in the same way as described above. Thereafter, the shutter blade 72 swings to open the shutter aperture 75 for the predetermined time in the same way as described above. Simultaneously, a pushing arm 72c of the shutter blade 72 pushes to turn on a synchronized flash trigger switch 31 of the flash unit 18, so a trigger voltage is applied to a flash discharge tube of the flash projector 7. Thus, a flash light is projected from the flash projector 7 toward the subject.

A fragment of the flash light is reflected from the subject, and enters through the light receiving window 9, and falls on the photo sensor 34. The photo sensor 34 conducts photoelectric current of an amount that corresponds to the amount of incident light. In the same way as described with reference to FIG. 4, the flash light automatically stops when the amount of light reflected from the subject and received on the photo sensor 34 reaches a predetermined limit.

Accordingly, over-exposure is prevented even when the flash light is projected onto a subject whose brightness is below the predetermined level and thus the large stop aperture 78 is placed on the optical axis 5a, and also the subject exists in a near range, e.g. from 1 m to 2 m, or the reflection factor of the subject is pretty high. Furthermore, since the large stop aperture 66 is used, both the main subject and the background are photographed in adequate exposure conditions. On the other hand, since the small stop aperture 77 is placed on the optical axis 5a when the subject brightness is above the predetermined level, over-exposure is prevented concerning both the main subject and the background.

Although the film speed of the photo filmstrip 25 is ISO 1600, and the capacitance of the main capacitor 35 is 80 μF in the second embodiment, these values may be modified appropriately. For example, the film speed may be ISO 3200. Where the shutter speed is 1/100 seconds, like the above embodiment, and the film speed is ISO 3200, it is preferable to set the f-number with the large stop aperture in a range from f/8, the f-number with the small stop aperture at f/22, and the capacitance of the main capacitor 35 in a range from 30 μF to 40 μF. Thereby, overexposure is prevented especially where a main subject is located in the near range in the flash photography. Also in the photography without flash, the above numeral values are effective for avoiding super-over-exposure or super-under-exposure.

FIGS. 17 to 24 show a third embodiment of the present invention, wherein a stop blade 120 having a small stop aperture 121 is automatically inserted into between a taking lens 5 and a shutter blade 72, when a subject brightness measured through a photo sensor 68, e.g. a CdS cell, of a photometric circuit 69 is equal to or above a predetermined level. The photometric circuit 69 may have the same configuration as shown in FIG. 9. Because the fundamental structure of the third embodiment is equivalent to those of the above embodiments, the following description relates only to essential features for the third embodiment.

Also in this embodiment, the photometric circuit 69 is activated in response to a shutter release operation, and the shutter blade 72 starts opening a shutter aperture 75 in a predetermined time after the photometric circuit 69 is activated, so that the shutter aperture 75 may not be opened before the stop blade 120 is switched over, as will be described in detail with reference to FIGS. 20 to 24.

Figure 17:
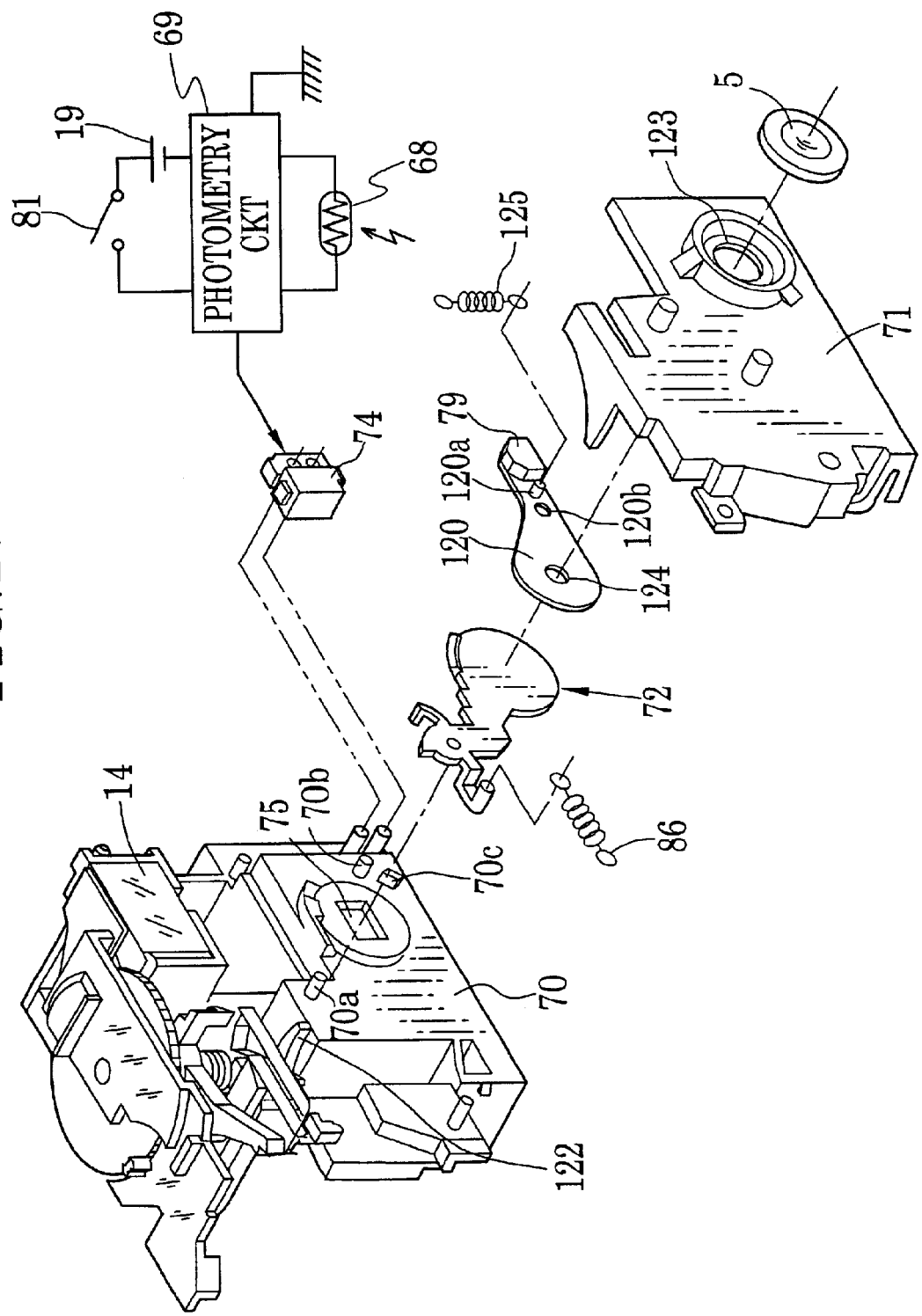
FIG. 17 is an exploded perspective view of a shutter mechanism and a stop changing mechanism of a film unit according to a third embodiment of the present invention.
Figure 18A:
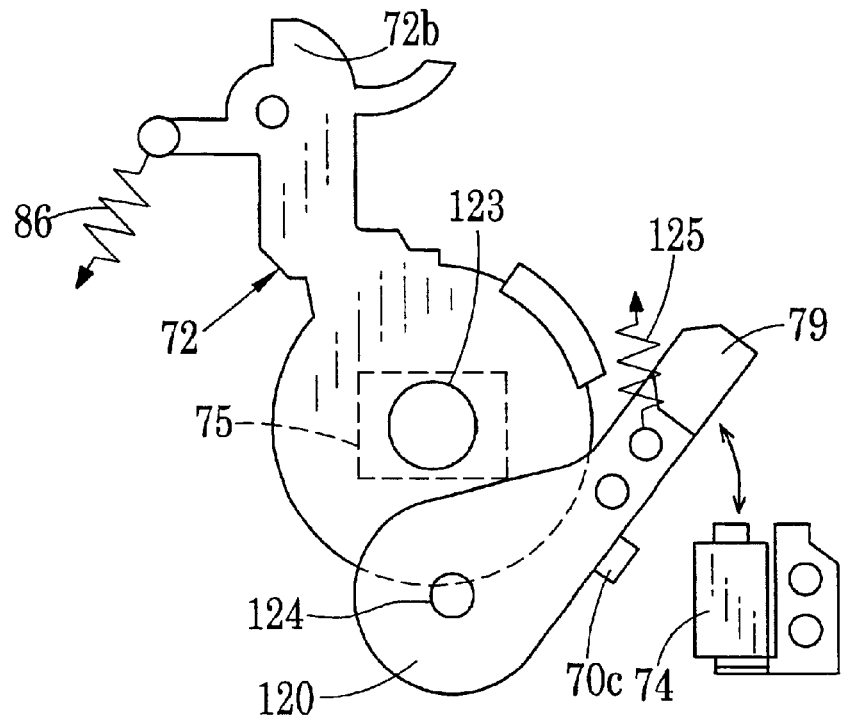
FIGS. 18A and 18B are explanatory diagrams illustrating two switching positions of the stop changing mechanism of the third embodiment.

As shown in FIG. 17, the stop blade 120 is disposed in front of the shutter blade 72, and is mounted pivotal about a pivot hole 120b by fitting the pivot hole 120b on a pin 70b that is formed on the front wall of the light-shielding chamber 70. The stop blade 120 is urged by a spring 125 to rotate in a counterclockwise direction in the drawings, and is stopped by a stop protrusion 70c, as shown in FIG. 18A, where the stop blade 120 is retracted away from the light path of the taking lens 5. Accordingly, a large stop aperture 123 formed through the shutter cover plate 71 is usually placed in the light path of the taking lens 5.

Figure 18B:
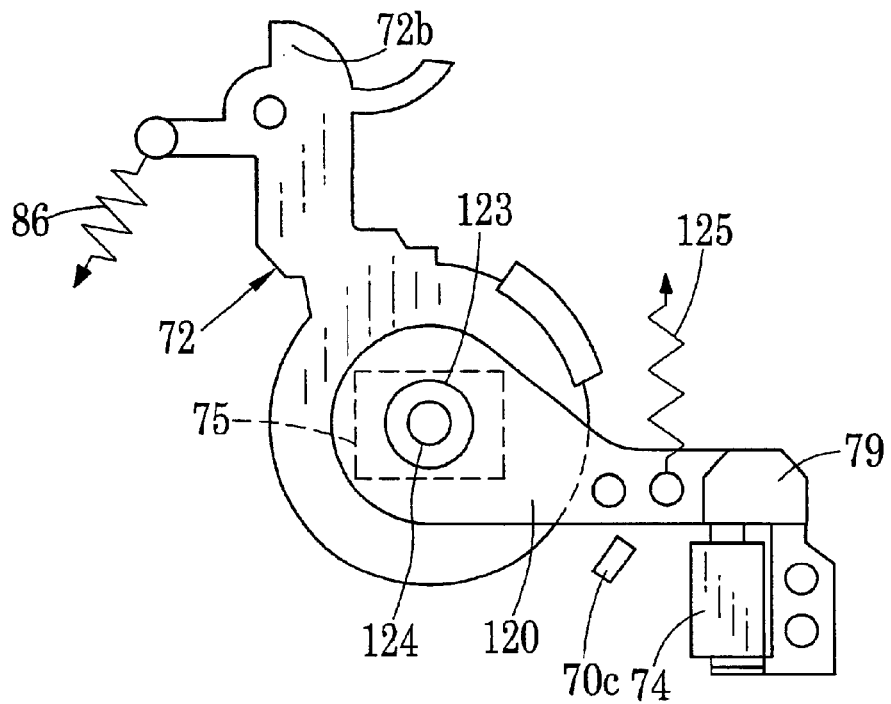

The photometric circuit 69 is substantially the same as that depicted in FIG. 9. A photometry start switch 81 is turned on to supply the photometric circuit 69 with power from a battery 19. If the subject brightness is above the predetermined level, the photometric circuit 69 conducts a current through an electromagnet 74, so the electromagnet 74 attracts an iron segment 79, causing the stop blade 120 to swing into between the taking lens 5 and the shutter blade 72, as shown in FIG. 18B. As a result, the small stop aperture 124 is placed in the light path of the taking lens 5.

The photometry start switch 81 is turned on immediately before the shutter blade 72 is released to open a shutter aperture 75, in the way as depicted with reference to FIGS. 19 to 24. In order to stop the stop blade 120 from swinging while the shutter aperture 75 is open, the photometric circuit 69 is designed to hold a photometric signal from the photo sensor 68 for a certain time, e.g. 100 milliseconds to 200 milliseconds. That is, even if the subject brightness goes below the predetermined level after the stop blade 120 is moved in the small stop position shown in FIG. 18B, the stop blade 120 is not displaced from the small stop position unless the shutter blade 72 completes opening and closing the shutter aperture 75.

Figure 19:
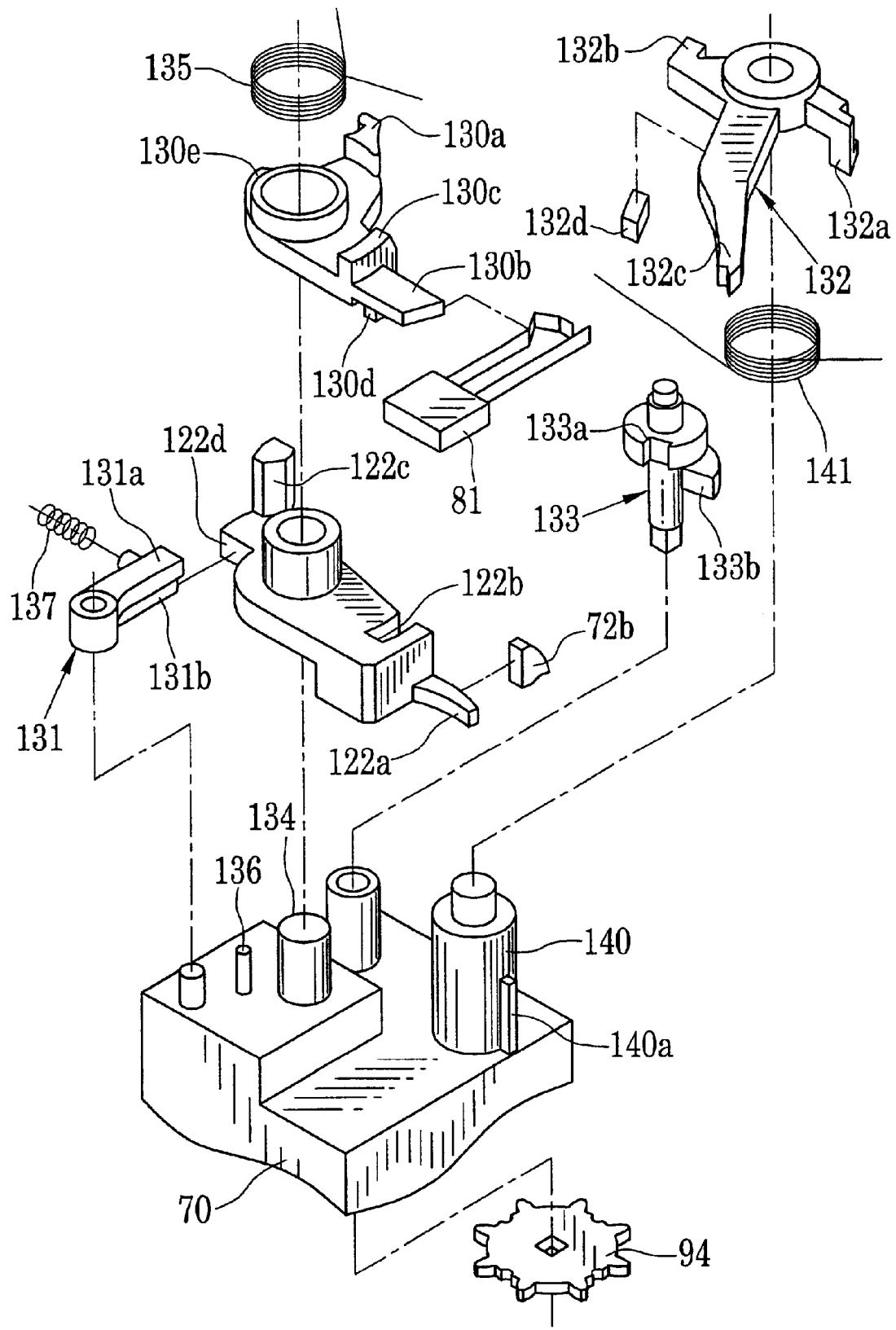
FIG. 19 is an exploded perspective view of a shutter mechanism of the third embodiment.

As shown in FIG. 19, a shutter mechanism is constituted of a shutter drive lever 122, an enabling lever 130, a stop lever 131, a release lever 132 and a cam member 133, all of which are disposed on the top of the light-shielding chamber 70 in a rotatable manner.

The shutter drive lever 122 has a knocker arm 122a, a cutout 122b, a pin 122c and a cam surface 122d. The enabling lever 130 has a cam follower hook 130a, a switching projection 130b, an upper projection 130c, a lower projection 130d and a cam projection 130e. The shutter drive lever 122 and the enabling lever 130 are pivotally mounted on a common axle 134. A torsion spring 135 is fitted on a top of the enabling lever 130, and has one end engaged with the pin 122c of the shutter drive lever 122, and the other end engaged with the cam follower hook 130a of the enabling lever 130. The torsion spring 135 urges the enabling lever 130 to rotate counterclockwise in the drawings. A stopper 136 is formed on the top of the light-shielding chamber 70 to limit a rotational range of the enabling lever 130.

The stop lever 131 has an upper lever portion 131a and a lower lever portion 131b, and is rotatable between an engaged position where a distal end of the lower lever portion 131b comes into a rotational orbit of the cam surface 122d of the shutter drive lever 122, and a disengaged position where the distal end of the lower lever portion 131b is away from the cam surface 122d. A spring 137 biases the stop lever 131 toward the engaged position.

The release lever 132 has a driven arm 132a, an engaging hook 132b, a winding lock claw 132c and a bottom projection 132d. The release lever 132 is pivotally supported on an axle 140. A torsion spring 141 is disposed under the release lever 132 and is supported by a projection 140a of the axle 140. One end of the torsion spring 141 is engaged with the driven arm 132a of the release lever 132, and the other end is engaged with the pin 122c of the shutter drive lever 122, so the torsion spring 141 biases the release lever 132 to rotate in a clockwise direction in the drawings, and also biases the shutter drive lever 122 to rotate in a counterclockwise direction. It is to be noted that the force of the torsion spring 141 is higher than that of the torsion spring 135.

The cam member 133 consists of a round disc with a notch 133a and a sector-shaped cam portion 133b. A sprocket wheel 94 is disposed inside the light-shielding chamber 70 and engaged with perforations of a photo filmstrip. The sprocket wheel 94 is connected to a rotary shaft of the cam member 133, so the cam member and the sprocket wheel 134 rotate together in cooperation with the photo filmstrip being advanced by rotating a film winding wheel 13 (see FIG. 20).

Figure 20:
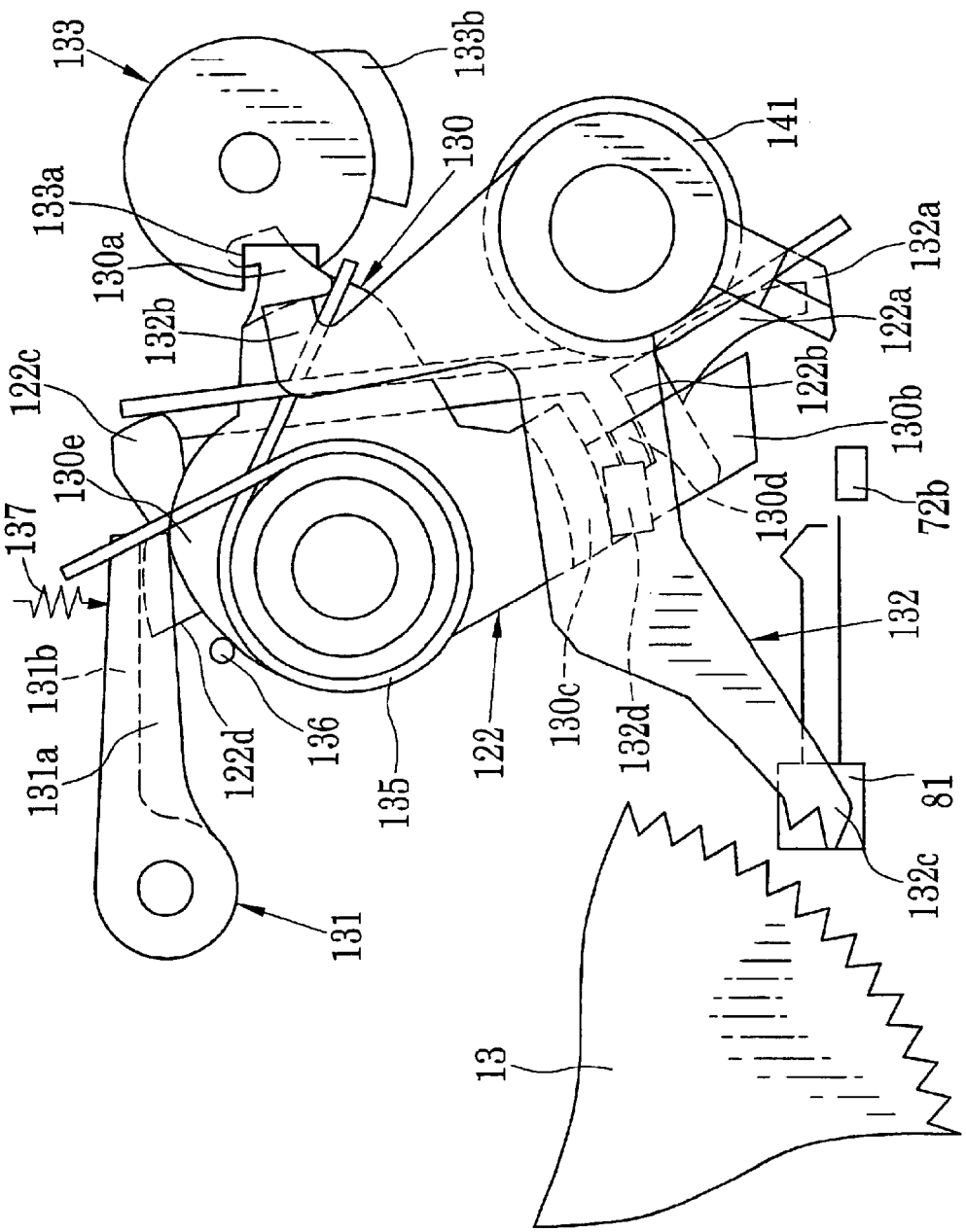
FIG. 20 is a top plan view of the shutter mechanism of FIG. 19 in a released position.

FIG. 20 shows a released position of the shutter mechanism. In this position, the enabling lever 130 is retained in a state where the cam projection 130e is in contact with the stopper 136, the lower projection 130d is inside the cutout 122b of the shutter drive lever 122, and the upper projection 130c of the enabling lever 130 is in contact with the bottom projection 132d of the release lever 132. On the other hand, the stop lever 131 is in the disengaged position, and the upper lever portion 131a of the stop lever 131 is in contact with the cam projection 130e of the enabling lever 130.

Figure 21:
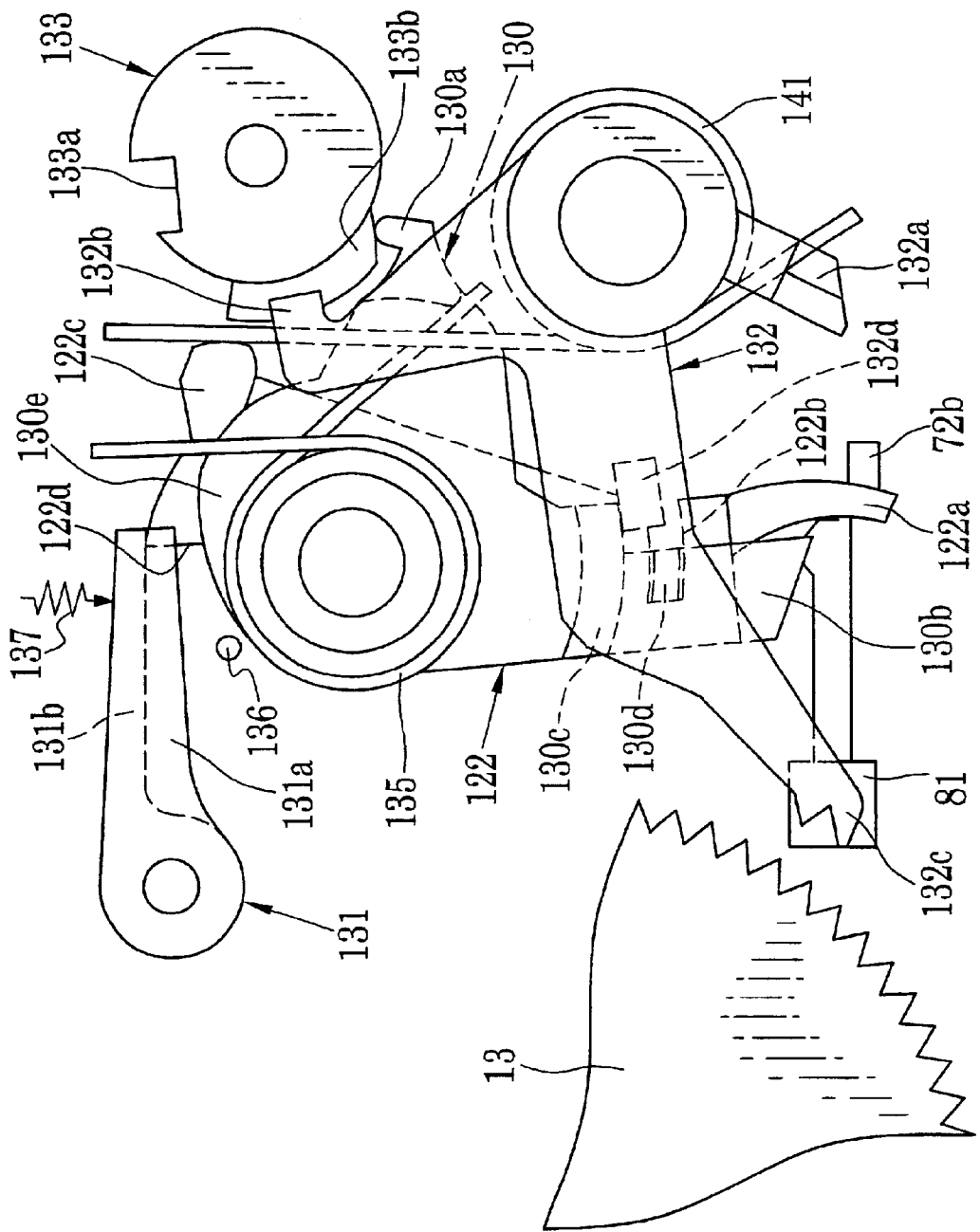
FIG. 21 is a similar view to FIG. 20, but showing a position where a shutter drive lever is being rotated toward a charged position.

As the film winding wheel 13 is rotated, the cam member 133 rotates in the counterclockwise direction with the sprocket wheel 94. As a result, the cam portion 133b comes in contact with the cam follower hook 130a of the enabling lever 130, as shown in FIG. 21, pushing the enabling lever 130 to rotate clockwise against the force of the torsion spring 135. Then, the lower projection 130d pushes the cutout 122b of the shutter drive lever 122, so the shutter drive lever 122 also rotates clockwise against the force of the torsion spring 141. Because the bottom projection 132d is still engaged with the upper projection 130c of the enabling lever 130 in the position shown in FIG. 21, the release lever 132 is retained in the same position as in FIG. 20.

Figure 22:
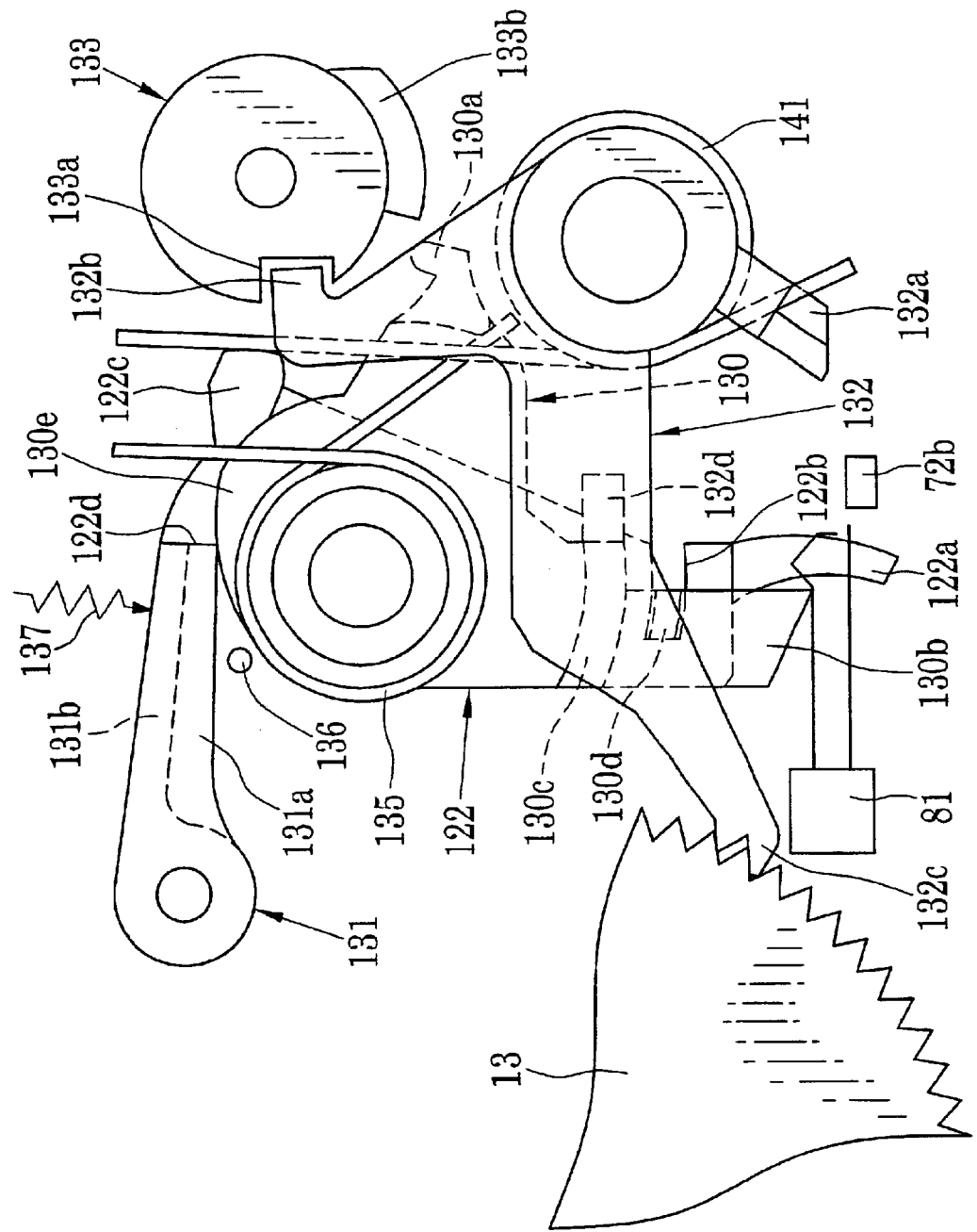
FIG. 22 is a similar view to FIG. 20, but showing the shutter mechanism in the charged position.

As the film winding wheel 13 is further rotated to wind up the filmstrip, the enabling lever 130 and the shutter drive lever 122 rotate further in the counterclockwise direction. When the filmstrip is wound up by one frame, the shutter mechanism reaches a charged position as shown in FIG. 22. In this position, the upper projection 130c of the enabling lever 130 is set away from the rotational orbit of the bottom projection 132d of the release lever 132, so the release lever 132 rotates clockwise according to the force of the torsion spring 141. Then, the engaging hook 132b is trapped in the notch 133a of the cam member 133, and the winding lock claw 132c is engaged with the film winding wheel 13, stopping the cam member 133 and the film winding wheel 13 from rotating.

In this position, the stop lever 131 comes to the engaged position, where the distal end of the lower lever portion 131b comes in contact with the cam surface 122d of the shutter drive lever 122, and thus stops the shutter drive lever 122 from rotating in the counterclockwise direction. Also the bottom projection 132d of the release lever 132 comes in the rotational orbit of the upper projection 130c of the enabling lever 130, so the enabling lever 130 is stopped from rotating in the counterclockwise direction. In this way, the shutter mechanism is held in the charged position.

Figure 23:
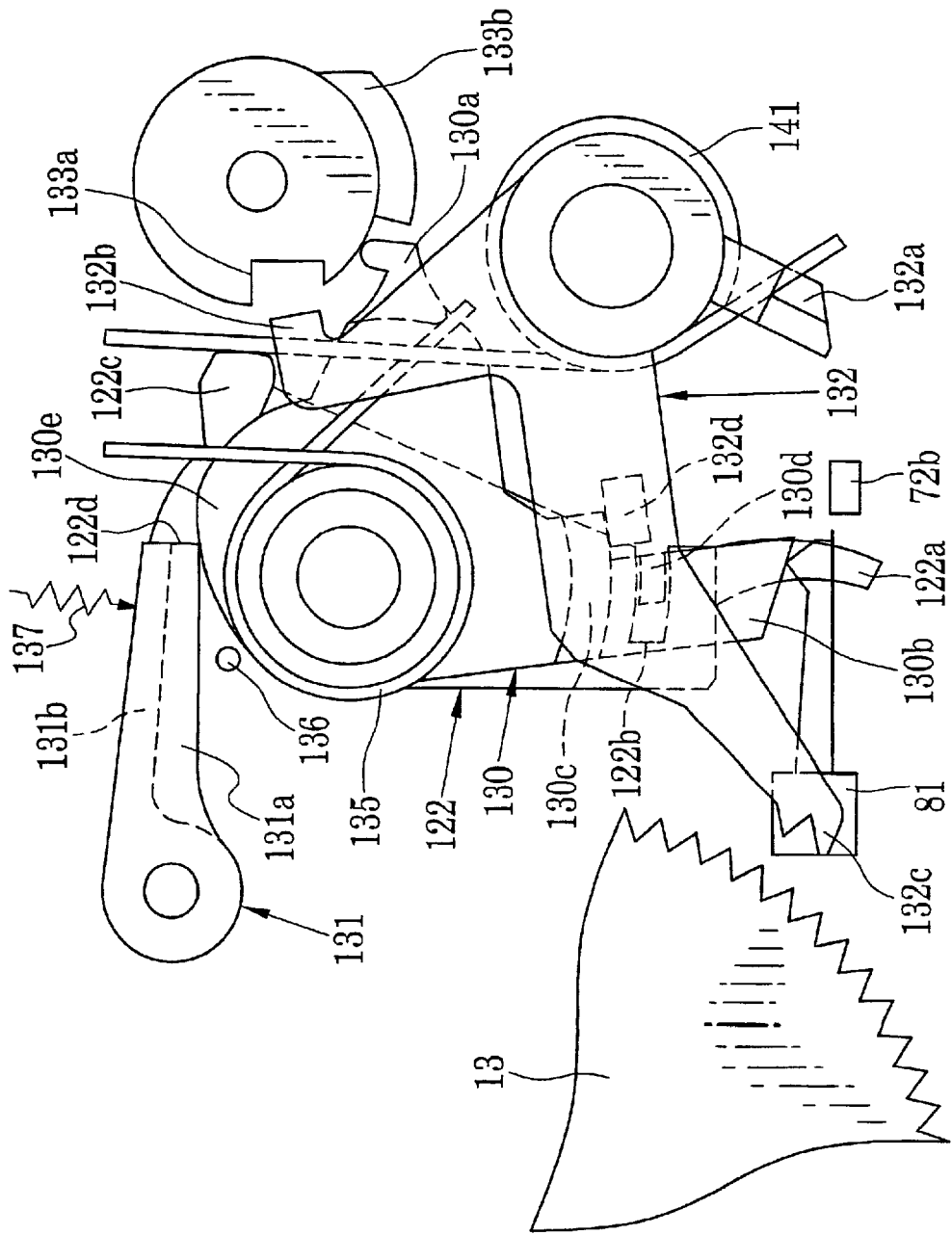
FIG. 23 is a similar view to FIG. 20, but showing a position where a photometry start switch of a photometric circuit is turned on immediately after a shutter button is pressed.

When the shutter button is pressed while the shutter mechanism is in the charged position, a not shown projection formed with the shutter button acts on the driven arm 132a of the release lever 132, so the release lever 132 rotates counterclockwise against the force of the torsion spring 141, as shown in FIG. 23. Then, the bottom projection 132d of the release lever 132 is disengaged from the upper projection 130c of the enabling lever 130, causing the enabling lever 130 to rotate counterclockwise according to the force of the torsion spring 135.

As the enabling lever 130 rotates counterclockwise, the switching projection 130b pushes a contact strip of the photometry start switch 81 to turn it on, so the photometric circuit 69 is activated. With the counterclockwise rotation of the enabling lever 130, the cam projection 130e of the enabling lever 130 pushes the upper lever portion 131a, so the stop lever 131 starts rotating from the engaged position to the disengaged position against the force of the spring 137.

Figure 24:
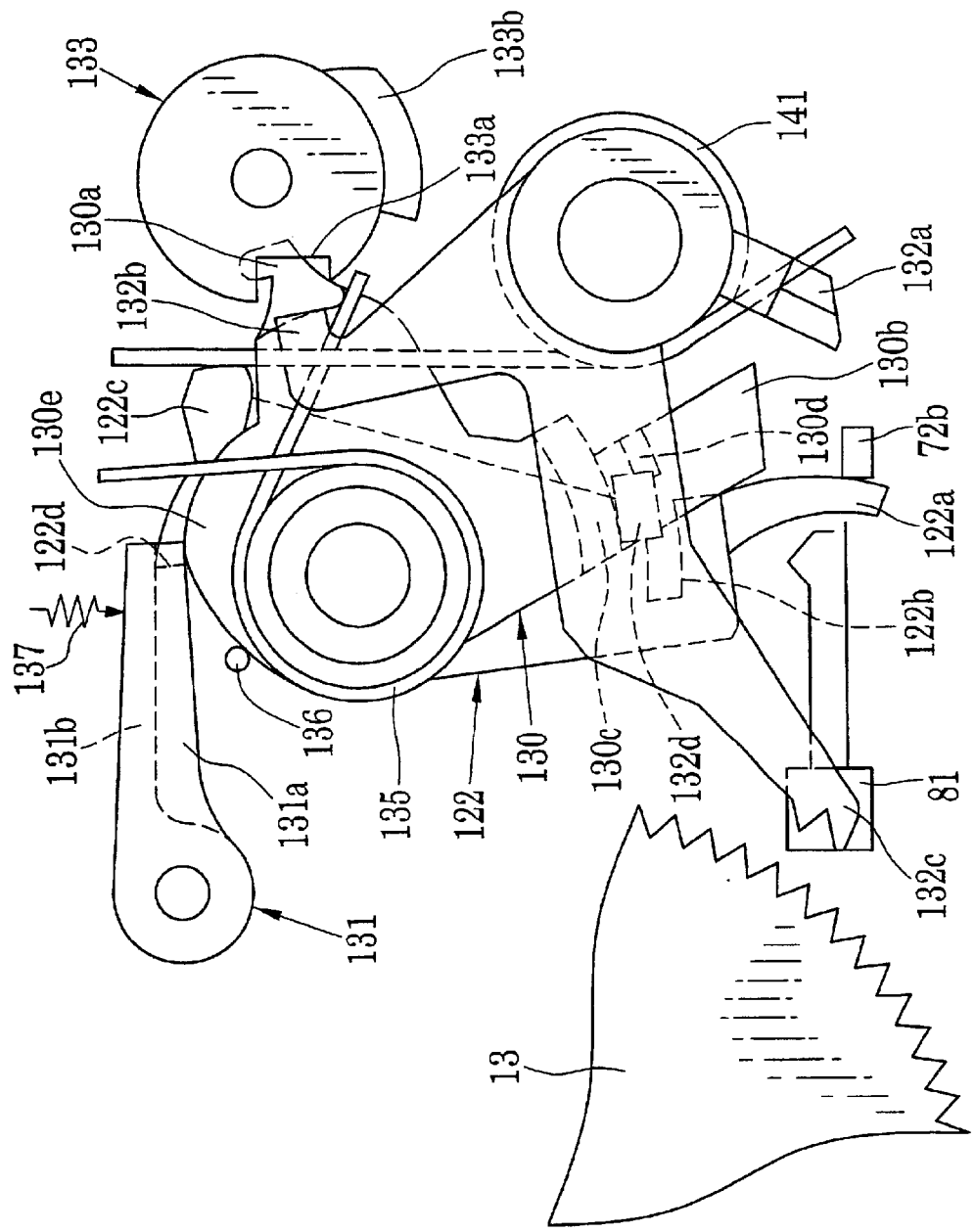
FIG. 24 is a similar view to FIG. 20, but showing a position where the shutter drive lever kicks a shutter blade to make an exposure.

When the enabling lever 130 rotates through a predetermined amount in the counterclockwise direction, the distal end of the lower lever portion 131b is disengaged from the cam surface 122d of the shutter drive lever 122, so the shutter drive lever 122 rotates counterclockwise according to the force of the torsion spring 141, as shown in FIG. 24. As the shutter drive lever 122 rotates from the charged position to the released position, the knocker arm 122a knocks a top claw 72b of the shutter blade 72, causing the shutter blade 72 to swing open the shutter aperture 75.

In this way, a certain time lag is provided from the time when the photometric switch 81 is turned on, to the time when the shutter blade 72 starts opening the shutter aperture 75. Since the time lag is determined by the rotational speed of the enabling lever 130, it is possible to set the time lag at an optimum value by adjusting the strength and shape of the torsion spring 135. It is preferable to set the time lag at about 10 milliseconds, the time necessary for switching over the stop plate 120 completely.

Although the third embodiment has been described with respect to the shutter mechanism and the photometric circuit 69 for automatically changing over the aperture-stop depending upon the subject brightness, it is possible to provide the third embodiment with the same flash light control circuit as shown in FIGS. 3 and 4 in addition to the photometric circuit 69.

In the third embodiment, the large stop aperture 123 is normally set in the light path of the taking lens 5, and the small stop aperture 124 is inserted into the light path of the taking lens when the subject brightness is high. It is alternatively possible to dispose the small stop aperture 124 usually behind the taking lens 5, and retract the stop blade 120 away from the light path of the taking lens 5 when the subject brightness is below a predetermined level. It is also possible to use a stop device consisting of a plurality of blades, and change the aperture size and thus the f-number by changing the size of a gap formed between these blades.

Although the photo film cartridge used in the illustrated embodiments is of IX240 type, the present invention is applicable to those film unit using a 35 mm photo film cartridge or another type photo film cartridge.

EXAMPLE

In order to determine optimum combinations of performance factors of the film unit for obtaining superior exposure conditions of the photographs, a number of experimental film units were produced with different f-numbers, shutter speeds, film speeds and guide numbers from each other, and photo-prints made from pictures photographed by these experimental film units under a variety of photographic conditions were organoleptically evaluated in view of lightness, sharpness and graininess. Among these experimental film units, best four film units as obtained high organoleptic evaluations were sorted out. Data of the performance factors of these four film units are shown in Table 1, wherein AV, TV, SV and LV are defined as follows:

AV: aperture value;
TV: time value;
SV: film speed value;
LV: light value;
Gno: guide number;
$AV = \log^2 (\text{f-number}^2)$
$TV = \log^2 (1/\text{shutter speed})$
$SV = \log^2 (0.32 \cdot \text{film speed})$
$LV = AV + TV - SV + 5$

TABLE 1

|  | FILM UNIT 1 | FILM UNIT 2 | FILM UNIT 3 | FILM UNIT 4 |
|---|---|---|---|---|
| f-NUMBER | f/5.60 | f/8.00 | f/22.00 | f/18.00 |
| AV | 4.97 | 6.00 | 8.92 | 8.34 |
| SHUTTER SPEED (second) | 1/60 | 1/100 | 1/150 | 1/100 |
| TV | 5.91 | 6.64 | 7.23 | 6.64 |
| FILM SPEED | 1600 | 800 | 800 | 1600 |
| SV | 10.00 | 8.00 | 8.00 | 9.00 |
| LV | 6.88 | 9.64 | 13.15 | 10.98 |
| Gno | 2.47 | 7.07 |  |  |
| FLASH REACHING RANGE (m) | 5.00 | 5.00 |  |  |

From the data shown in Table 1, following conditions (1) and (2) for the light values of the film unit were respectively deduced with regard to a large stop aperture and a small stop aperture:

$6 \leq LV \leq 11.5$      Condition (1)

$10.5 \leq LV \leq 15$      Condition (2)

Thereafter, three types of film units #A, #B and #C were produced: the film unit #A is provided with an automatic stop changing device that changes the aperture size so as to satisfy the above conditions (1) and (2); the film unit #B is configured in the same way as the sample #A, but the aperture size is changed over by manually switching the flash device on or off; and the film unit #C is not provided with a stop changing device. The performance values of these film units #A, #B and #C are shown in Table 2.

TABLE 2

|  | FILM UNIT #A | | FILM UNIT #B | | FILM UNIT #C |
|---|---|---|---|---|---|
|  | LARGE STOP | SMALL STOP | LARGE STOP | SMALL STOP |  |
| f-NUMBER | f/8.00 | f/18.00 | f/8.00 | f/18.00 | f/8.00 |
| AV | 6.00 | 8.34 | 6.00 | 8.34 | 6.00 |
| SHUTTER SPEED (second) | 1/100 | 1/100 | 1/100 | 1/100 | 1/150 |
| TV | 6.64 | 6.64 | 6.64 | 6.64 | 7.23 |
| FILM SPEED | 1600 | 1600 | 1600 | 1600 | 800 |
| SV | 9.00 | 9.00 | 9.00 | 9.00 | 8.00 |
| LV | 8.64 | 10.98 | 8.64 | 10.98 | 10.23 |
| Gno | 5.00 | 5.00 | 5.00 |  |  |
| FLASH REACHING RANGE (m) | 5.00 | 5.00 | 5.00 |  |  |

Then, organoleptic evaluations of these three film units #A to #C were made by observing photo-print samples obtained from pictures photographed by the film units #A to #C in different locations, i.e. in a bright room of about LV 6, in the evening outdoors' of about LV 8, and on the shore in daylight of about LV 15. Ten evaluators individually selected from among these samples those they think best in view of the lightness, the sharpness and the graininess.

Table 3 shows the correlation between the sample numbers and the film unit numbers and the photographic locations.

Table 4 shows the results of the organoleptic evaluations of the respective photo-print samples, that is, the number of persons who select the associated sample as the best one with regard to each evaluation factor.

TABLE 3

| PHOTOGRAPHIC LOCATIONS | FILM UNIT #A | | FILM UNIT #B | | FILM UNIT #C | |
|---|---|---|---|---|---|---|
|  | LARGE STOP | SMALL STOP | LARGE STOP | SMALL STOP | | |
| LV 6 (BRIGHT ROOM) | SAMPLE A1 (FLASH ON) |  | SAMPLE B1 (FLASH ON) | SAMPLE B4 (FLASH OFF) | SAMPLE C1 (FLASH ON) | SAMPLE C4 (FLASH OFF) |
| LV 6 (EVENING OUTDOOR) | SAMPLE A2 (FLASH ON) SAMPLE A2' (FLASH OFF) |  | SAMPLE B2 (FLASH ON) | SAMPLE B5 (FLASH OFF) | SAMPLE C2 (FLASH ON) | SAMPLE C5 (FLASH OFF) |

TABLE 3-continued

| PHOTOGRAPHIC LOCATIONS | FILM UNIT #A | | FILM UNIT #B | | FILM UNIT #C |
| --- | --- | --- | --- | --- | --- |
| | LARGE STOP | SMALL STOP | LARGE STOP | SMALL STOP | |
| LV 15 (DAYLIGHT ON THE SHORE) | SAMPLE A3 (FLASH OFF) | SAMPLE B3 (FLASH ON) | SAMPLE B6 (FLASH OFF) | SAMPLE C3 (FLASH ON) | SAMPLE C6 (FLASH OFF) |

TABLE 4

| | EVALUATION FACTORS | | |
| --- | --- | --- | --- |
| | LIGHTNESS | SHARPNESS | GRAININESS |
| SAMPLE A1 | 10 persons | 4 persons | 7 persons |
| SAMPLE A2 | 10 persons | 2 persons | 6 persons |
| SAMPLE A2' | 8 persons | 8 persons | 8 persons |
| SAMPLE A3 | 4 persons | 8 persons | 2 persons |
| SAMPLE B1 | 10 persons | 4 persons | 7 persons |
| SAMPLE B2 | 10 persons | 2 persons | 6 persons |
| SAMPLE B3 | 0 | 0 | 3 persons |
| SAMPLE B4 | 0 | 0 | 0 |
| SAMPLE B5 | 0 | 0 | 0 |
| SAMPLE B6 | 4 persons | 8 persons | 2 persons |
| SAMPLE C1 | 0 | 6 persons | 3 persons |
| SAMPLE C2 | 0 | 8 persons | 4 persons |
| SAMPLE C3 | 3 persons | 2 persons | 2 persons |
| SAMPLE C4 | 0 | 0 | 0 |
| SAMPLE C5 | 0 | 0 | 0 |
| SAMPLE C6 | 3 persons | 0 | 3 persons |

Apparently from the results shown in Table 4, the film unit #C cannot provide good quality photographs unless the photographic location is in good conditions. Although the film unit #B with the manual stop changing device got generally high evaluations as for the samples B1, B2 and B6, the evaluations of the samples B3 to B5 were very low. This is because the sample B3 was photographed with an unnecessary flash light in the strong daylight, and the samples B4 and B5 were photographed without flash in spite of the relatively dark photographic locations. Namely, if the photographer fails to make a proper decision as to whether the flash light is needed or not, the film unit #B cannot provide good quality photographs. On the contrary, the film unit #A having the automatic stop changing device and satisfying the above conditions (1) and (2) can provide good quality photographs in any photographic locations.

What is claimed is:

1. A lens-fitted photo film unit preloaded with a roll of unexposed photo filmstrip, and provided with a shutter mechanism for exposing said photo filmstrip through a taking lens, said lens-fitted photo film unit comprising:
   a flash device for projecting a flash light toward a subject;
   a flash light control device that measures a light amount reflected from the subject while said flash device is projecting the flash light, and stops said flash device from projecting the flash light when the measured light amount reaches a predetermined value, the flash light control device comprising:
      a thyristor connected so that when the thyristor is turned on, current is diverted from the flash device; and
      an ON-voltage generating circuit comprising a resistor and a capacitor connected so that when the capacitor discharges through the resistor, a voltage across the resistor turns on the thyristor; and
   a stop changing device that changes over an aperture-stop at least between a large size and a small size.

2. A lens-fitted photo film unit as recited in claim 1, further comprising a flash ON-OFF member for manually turning said flash device on or off, and wherein said stop changing device cooperates with said flash ON-OFF member such that said stop changing device sets the aperture-stop at said large size while said flash device is on, or at said small size while said flash device is off.

3. A lens-fitted photo film unit as recited in claim 1, wherein said preloaded photo filmstrip has a film speed of ISO 3200, and said taking lens has an f-number of f/5.6 to f/8.0 when the aperture-stop is set at said large size, whereas a main capacitor of said flash device has a capacitance of 20 $\mu$F to 40 $\mu$F.

4. A lens-fitted photo film unit as recited in claim 3, wherein said shutter mechanism has a shutter speed of 1/80 seconds and said taking lens has an f-number of f/26 when the aperture-stop is set at said small size.

5. A lens-fitted photo film unit as recited in claim 1, wherein said preloaded photo filmstrip has a film speed of ISO 1600, and said taking lens has an f-number of f/5.6 to f/8.0 when the aperture-stop is set at said large size, whereas a main capacitor of said flash device has a capacitance of 30 $\mu$F to 60 $\mu$F.

6. A lens-fitted photo film unit as recited in claim 5, wherein said shutter mechanism has a shutter speed of 1/80 seconds and said taking lens has an f-number of f/18 when the aperture-stop is set at said small size.

7. A lens-fitted photo film unit as recited in claim 1, wherein said preloaded photo filmstrip has a film speed of ISO 800, and said taking lens has an f-number of f/6.7 when the aperture-stop is set at said large size, whereas a main capacitor of said flash device has a capacitance of 50 $\mu$F.

8. A lens-fitted photo film unit as recited in claim 7, wherein said shutter mechanism has a shutter speed of 1/80 seconds and said taking lens has an f-number of f/12.3 when the aperture-stop is set at said small size.

9. The lens-fitted photo film unit of claim 1, wherein the flash light control device further comprises:
   a photo sensing section structured to generate a voltage output based on the reflected light;
   a switching circuit connected to the voltage output of the photo sensing section, the switching circuit arranged to conduct when the voltage output reaches a threshold voltage so as to discharge the capacitor of the ON-voltage generating circuit.

10. The lens-fitted photo film unit of claim 9, wherein the flash light control device further comprises a delay capacitor connected in parallel with the photo sensing section so as to divert current from the flash light control device at a beginning of a flash cycle.

11. A lens-fitted photo film unit preloaded with a roll of unexposed photo filmstrip, and provided with a shutter mechanism for exposing said photo filmstrip through a taking lens, said lens-fitted photo film unit comprising:

a flash device for projecting a flash light toward a subject; and means for measuring a light amount reflected from the subject while said flash device is projecting the flash light, and stopping said flash device from projecting the flash light when the measured light amount reaches a predetermined value, the means for measuring comprising:

means for converting a cumulative amount of the reflected light into an output voltage;

means for selective diversion of current away from the flash device;

means for switching the means for selective diversion based on the output voltage; and means for delaying the converting of the reflected light into the output voltage.

12. The lens-fitted photo film unit of claim 11, wherein the means for converting comprises a first capacitor charged by current based on an amount of the reflected light; and wherein the means for delaying comprises a second capacitor connected in parallel with the means for converting.

13. The lens-fitted photo film unit of claim 12, wherein the means for selective diversion comprises a thyristor having an anode and cathode connected in parallel with the flash device.

14. The lens-fitted photo film unit of claim 13, wherein the thyristor comprises a gate connected to a diversion capacitor and a diversion resistor.

15. The lens-fitted photo film unit of claim 14, wherein the means for switching is constructed so that when the output voltage from the means for converting reaches a threshold value, the means for switching discharges the diversion capacitor through the diversion resistor, so that a voltage across the diversion resistor turns on the thyristor.

\* \* \* \* \*